United States Patent [19]

Buma et al.

[11] Patent Number: 4,729,580
[45] Date of Patent: * Mar. 8, 1988

[54] SUSPENSION CONTROLLER

[75] Inventors: Shuuichi Buma, Toyota; Toshio Onuma, Susono; Kaoru Ohashi, Okazaki; Masami Itou, Toyota, all of Japan

[73] Assignee: Toyota Jidosha Kabushiki Kaisha, Toyota, Japan

[*] Notice: The portion of the term of this patent subsequent to Jan. 6, 2004 has been disclaimed.

[21] Appl. No.: 914,737

[22] Filed: Oct. 1, 1986

[30] Foreign Application Priority Data

Oct. 1, 1985 [JP] Japan .................................. 60-219685

[51] Int. Cl.⁴ ............................................ B60G 11/26
[52] U.S. Cl. ..................................... 280/707; 280/6 M; 364/424
[58] Field of Search ................ 280/6 M, 707; 364/424

[56] References Cited

U.S. PATENT DOCUMENTS 4,350,354  9/1982  Dotti et al. .......................... 280/6 M
4,600,215  7/1986  Kyroki et al. ........................ 280/707
4,634,143  1/1987  Asami et al. ......................... 280/707

FOREIGN PATENT DOCUMENTS 59-63218  4/1984  Japan ................................... 280/707

Primary Examiner—John J. Love
Assistant Examiner—Kenneth R. Rice
Attorney, Agent, or Firm—Oblon, Fisher, Spivak, McClelland & Maier

[57] ABSTRACT

A suspension controller of a vehicle having a suspension between a body and a wheel, includes: a vehicle height detection means for detecting a vehicle height at a front wheel and for generating a vehicle height signal according to the detected height; a determination means for receiving the vehicle height signal, and for generating height data responsive to the vehicle height signal, for determining whether the difference between the maximum and the minimum value of the height data during a predetermined period is greater than a reference value, the period being determined within a cycle time of sprung mass vibration, and for generating a suspension control signal, and a suspension characteristic alteration means for altering characteristics of the suspension in response to the suspension control signal.

10 Claims, 39 Drawing Figures

4e2...A/D CONVERTER

FIG.10

| VEHICLE SPEED | | 25 | 40 | 70 | 90 | 100 | |
|---|---|---|---|---|---|---|---|
| ROUGH ROAD | SOFT | SOFT | SPORT | SPORT | SPORT | SPORT | HARD |
|  |  | SPORT |  |  |  |  |  |
| FLAT ROAD | SOFT | SOFT | SOFT | SOFT | SOFT | SPORT | SPORT |
|  |  |  |  |  | SPORT |  |  |

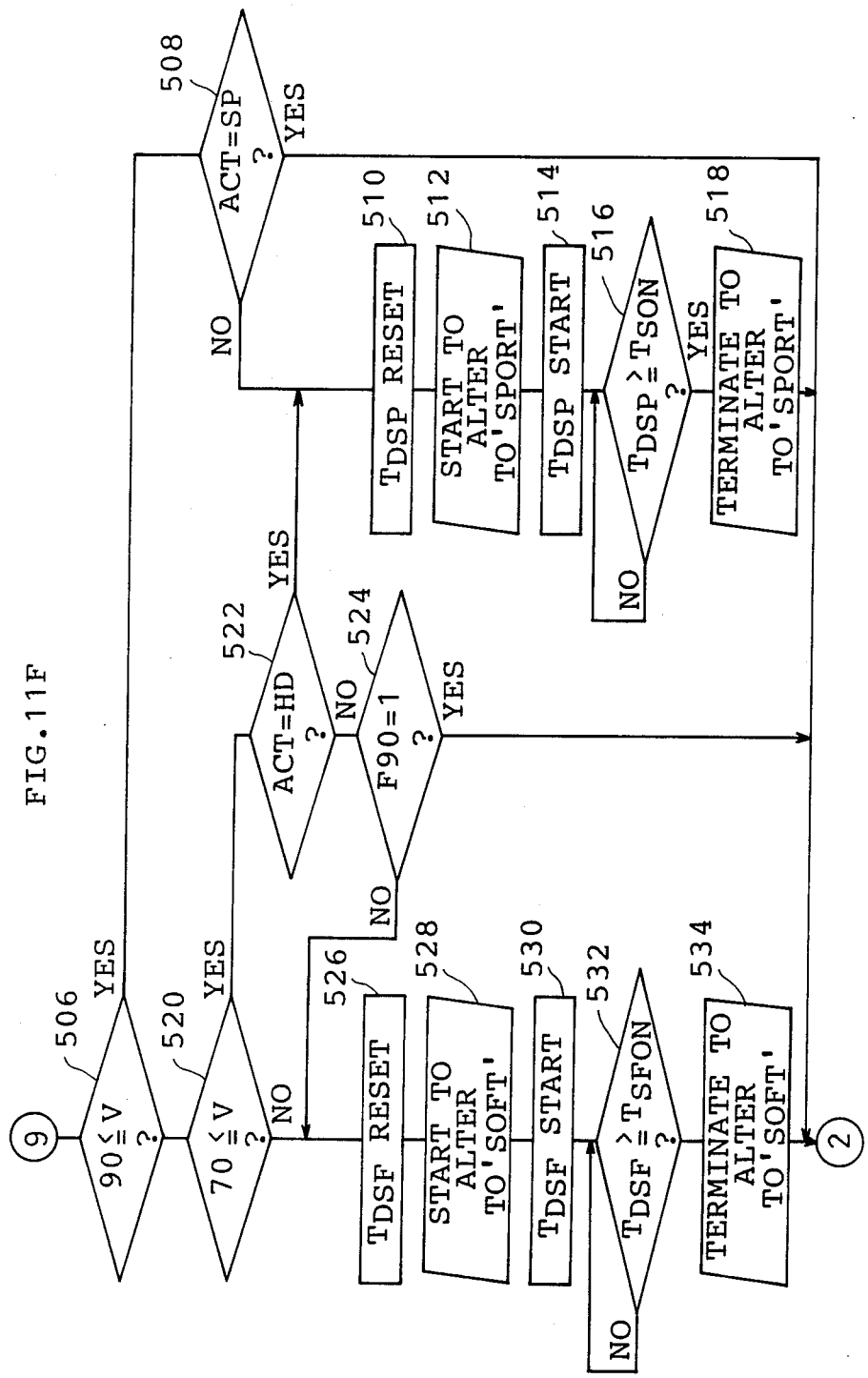

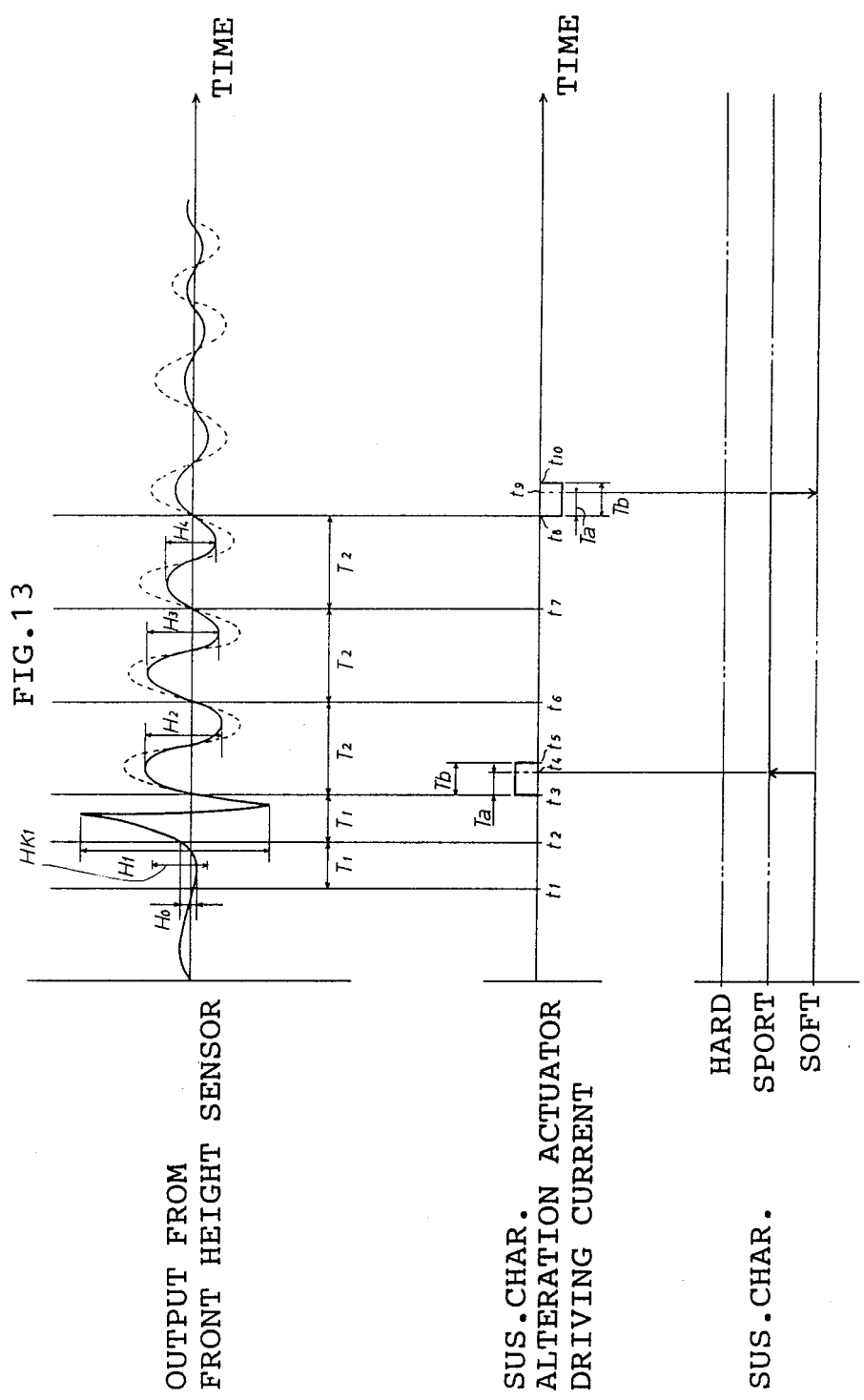

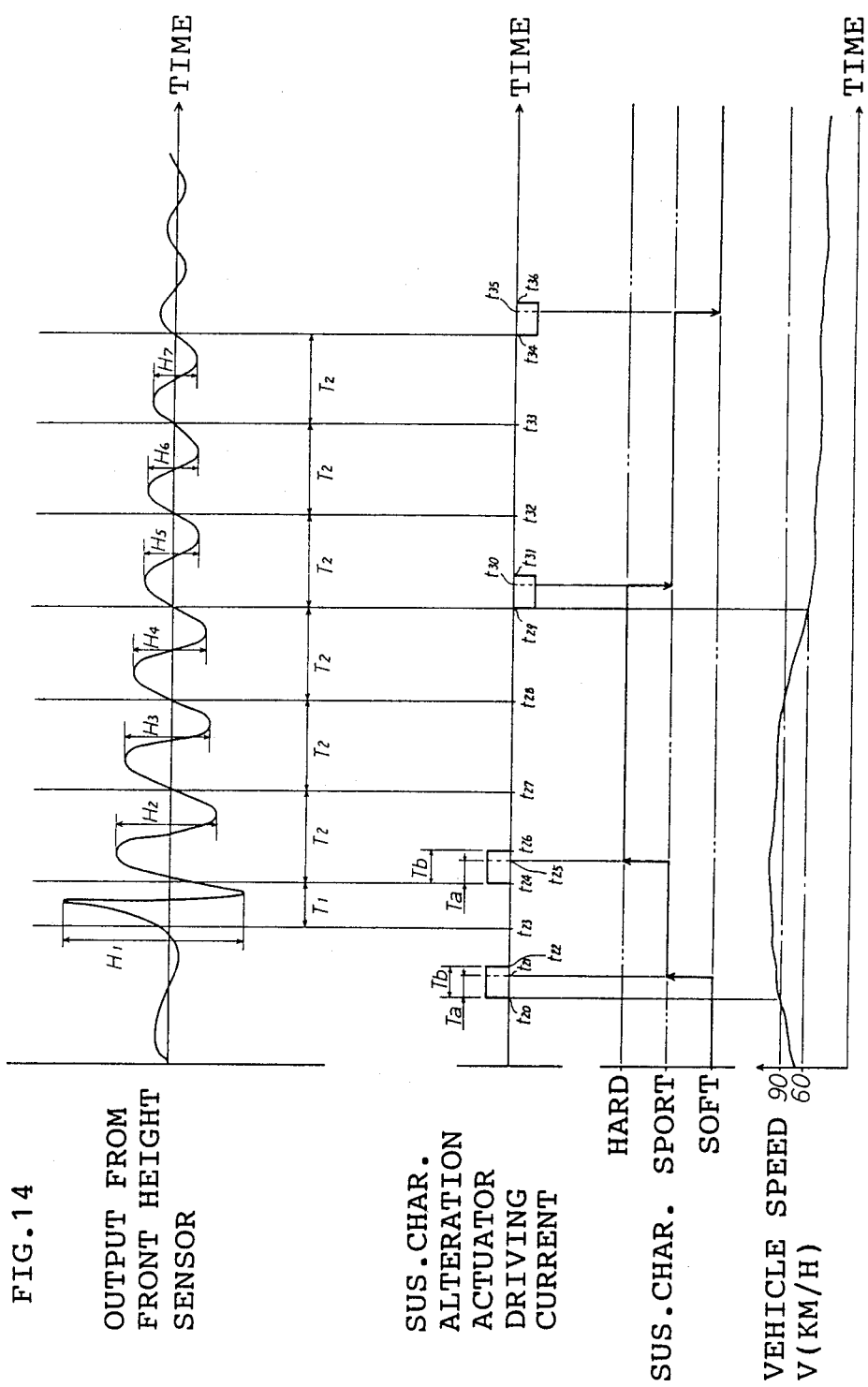

SUSPENSION CONTROLLER

BACKGROUND OF THE INVENTION

1. Field of the Invention

The present invention relates to a suspension controller, especially to a suspension controller which alters the suspension characteristic suitably for the condition of a road on which vehicle moves.

2. Description of the Related Art

Recently, a suspension controller has been proposed in which the road condition is detected by a vehicle height sensor which detects the change in the distance between a vehicle axle and the body. During running on a rough road, the suspension characteristic or the vehicle height is altered for damping the vibration of the vehicle body for attaining good controllability and stability as well as good riding comfort. An example of such an invention as described above is found in Published Unexamined Japanese Patent Application No. 57-172808 entitled "Vehicle Height Adjusting Apparatus". In this application, when the road condition is changed from smooth to rough, the suspension controller is operated to increase the vehicle height by more than a predetermined value so as to prevent bottoming of the vehicle attributable to the bounding of the vehicle. The above prior art detects the rough road if the determination is made that the actual vehicle height exceeds a predetermined reference value and such case occurs more frequent than usual. Accordingly, vehicle height is altered to higher position that is suitable for running on a rough road.

However, the suspension controller according to the prior art possesses the following problems.

(1) Vehicle vibration arising when the vehicle moves over continuous rough road, e.g., the vibration characterized as pitching or bouncing, usually includes vibration derived by superimposing the resonant vibration of sprung mass (frequency of 1.2–1.3 Hz) on the frequency of the resonant vibration of unsprung mass (about 15 Hz). The prior art is operated to detect the suspension characteristic altering condition on the basis of the counted number of times that the actual vehicle height surpassed the average vehicle height by more than a predetermined value within a predetermined time interval. However, the above-mentioned predetermined time interval is not set considering the cycle time of the resonant vibration of sprung mass. Therefore, the determination of the condition of vibration being exerted on the vehicle body cannot be made, unless the vehicle moves on a road surface for more than the predetermined time interval.

(2) Due to the problem mentioned in paragraph (1), the alteration operation of the suspension characteristic is delayed because it takes a long time to determine the vibration condition. Moreover, once the vibration as mentioned above occurs, it is impossible to eliminate it until the suspension characteristic is altered, thus giving an uncomfortable feeling to the passengers. In addition to bad riding comfort, such vibration alters the vehicle attitude. Accordingly, the drivability and stability of the vehicle are deteriorated.

SUMMARY OF THE INVENTION

An object of the present invention is to provide a suspension controller for a vehicle operated to alter the suspension characteristic by rapidly detecting vibrations due to continuous rough road running and those having a predetermined cycle range, namely, vibrations causing vehicle pitching and bouncing.

To solve the above-mentioned problems, the suspension controller according to the present invention having a principle as shown in FIG. 1, includes: a suspension between a body and a wheel; a vehicle height detection means for detecting a vehicle height at a front wheel and for generating a vehicle height signal according to the detected height; a determination means having means for receiving the vehicle height signal, means for generating height data responsive to the body height signal, means for determining whether the difference between the maximum and the minimum values of the height data during a predetermined period is greter than a reference value, the period being smaller than a cycle time of vehicle sprung mass vibration, and means for generating a suspension control signal in response to the height data; and a suspension characteristic alteration means for altering at least one characteristic of the suspension in response to the suspension control signal.

The vehicle height detection means M1 detects the vehicle height at the front wheel for the purpose to generate a vehicle height signal. The height detection means may adopt a structure in which a potentiometer detects the displacement of the suspension arm relative to the vehicle body and outputs in the form of an analog signal. Another possible height detection means detects displacement as rotation angle of a slitted disk, and detects the amount of light passing through the slit and outputs a digital signal. From the vehicle height, the vehicle height data is obtained. The vehicle height data includes various data such as displacement from a target vehicle height, speed of the height change, acceleration rate of the height change, and amplitude of the vibration of the vehicle height. The amplitude of the vibration of the vehicle is the difference between the maximum value and the minimum value of the vehicle height change detected within the predetermined time interval.

The determination means M2 determines if the difference between the maximum value and the minimum value of the vehicle height data detected by the vehicle height detection means M1 within the predetermined time interval (preset to be smaller than the cycle time of resonant vibration of sprung mass) is greater than a predetermined value. If the difference is greater than the predetermined value, the determination means M2 generates a suspension control signal. Here, the cycle time of the resonant vibration of sprung corresponds to the cycle time of the resonant vibration of the vehicle body supported by the suspension, i.e., having a frequency ranging in 1.2–1.3 Hz. The determination means may be operated to obtain the vehicle height data every predetermined time interval and to calculate the difference between the maximum value and the minimum value of the vehicle height data so as to determine if the result of the calculation is greater than the predetermined value. The predetermined time interval is set within a range from a cycle time of the resonant vibration of sprung mass to a semi-cycle time thereof. The determination means M2 may be realized by a logic circuit of discrete electronic elements. The determination means M2 may instead by realized by a logic circuit of integrated chips, including a CPU, a ROM, a RAM and other peripheral circuit elements.

The suspension characteristic alteration means M3 alters the suspension characteristic according to the suspension control signal. For example, the suspension characteristic alteration means M3 may discretely and continuously alter the suspension characteristics such as the spring constant of a suspension, damping force of a shock absorber, stiffness of a bush, and compliance of the stabilizer. It may well adopt the structure in which main air chambers and auxiliary air chambers of the suspensions are communicated with and isolated from each other so as to change the spring constant to be greater or smaller respectively. It may also adopt another structure to change the diameter of the orifice that adjusts the oil flow of the shock absorber for increasing and decreasing the damping force of the shock absorber. Still another structure is available to alter the stiffness of the bush for altering the suspension characteristic in three stages, i.e. 'HARD' and 'SOFT' states, and the intermediate state of the above-mentioned two states, namely, 'SPORT' state.

The suspension controller structured as above can rapidly detect a vibration having a cycle time close to the resonant vibration of sprung mass and rapidly alter the suspension characteristic. Accordingly the technological aim of the present invention is attained.

BRIEF DESCRIPTION OF DRAWINGS

The foregoing and other objects are attained by the invention as will be apparent from the following description taken in connection with the accompanying drawings, in which:

FIG. 10 is an example of a table defining the relation between vehicle speed and suspension characteristic.

FIGS. 11A–11I are flow charts showing the process steps executed by the ECU;

FIG. 13 shows timing charts of the output from the front height sensor, driving current to an actuator for altering the suspension characteristic, and change in the suspension characteristic in the case where the vehicle speed does not vary;

FIG. 14 shows timing charts of the output from the front height sensor, driving current to the actuator for altering the suspension characteristic, and change in the suspension characteristic in the case where the vehicle speed varies.

FIGS. 15–20 respectively show other examples of units for altering the suspension characteristic, besides the air suspensions;

DETAILED DESCRIPTION OF THE PREFERRED EMBODIMENTS

Preferred embodiments of the present invention are described in detail hereinunder on the basis of the attached drawings.

Figure 1:
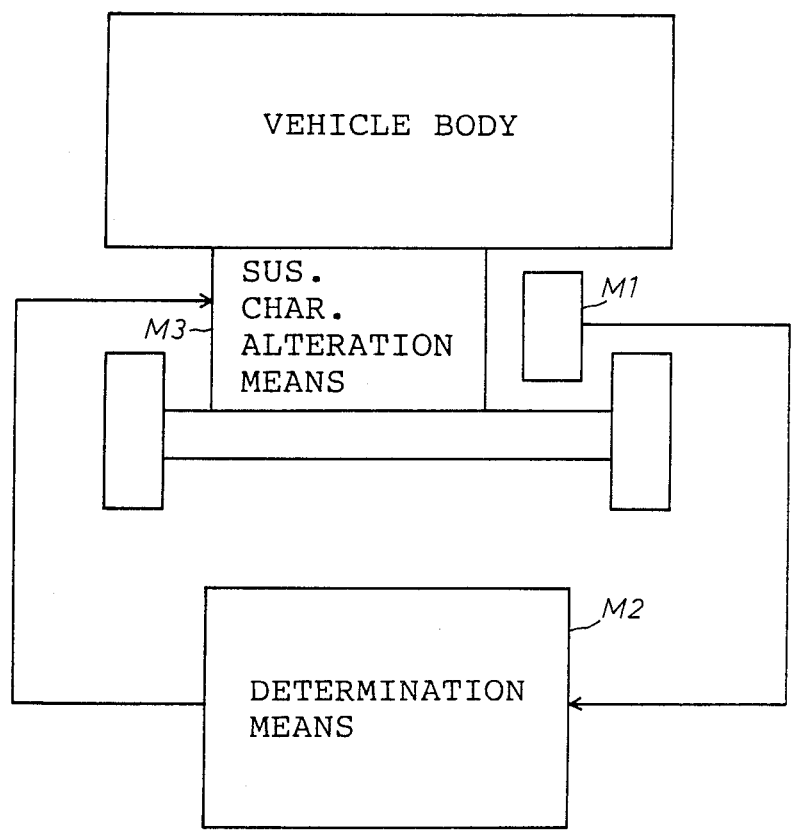
FIG. 1 is a schematic view showing principal structures of the present invention.
Figure 2:
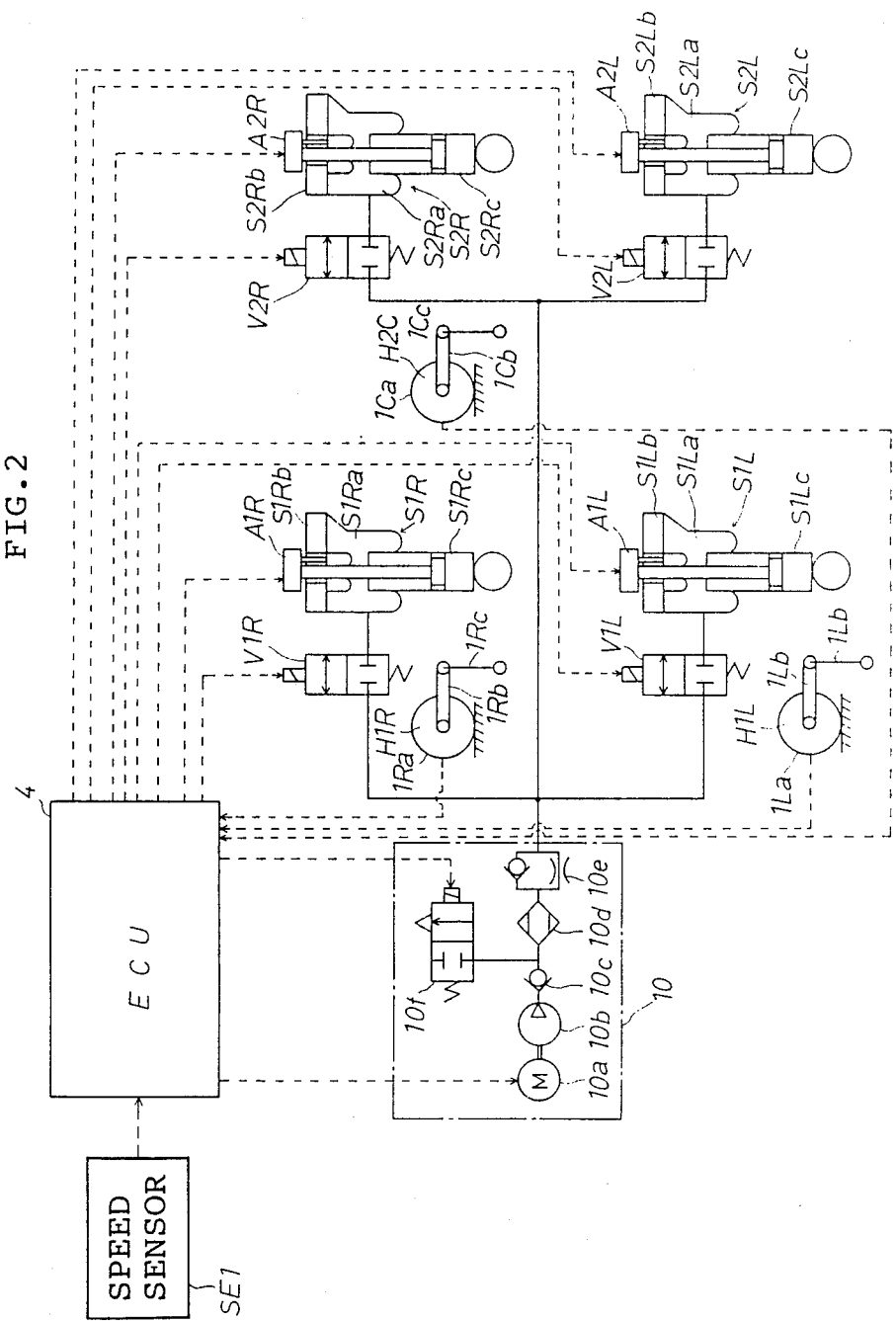
FIG. 2 is a systematic structure of one embodiment of the present invention.

FIG. 2 shows details of a suspension controller for a vehicle, having air suspensions, according to the first embodiment of the invention. A right front vehicle height sensor H1R is provided between a vehicle body and a right front wheel to detect the distance between the vehicle body and a right suspension arm which follows the motion of the wheel. A left front vehicle height sensor H1L is provided between the vehicle body and a left front wheel to detect the distance between the vehicle body and a left suspension arm. Short cylindrical bodies 1Ra and 1La of the vehicle height sensors H1R and H1L are secured on the vehicle body. Links 1Rb and 1Lb respectively extend substantially perpendicularly from each center shaft of the bodies 1Ra and 1La. Turnbuckles 1Rc and 1Lc are rotatably coupled to each one end of the links 1Rb and 1Lb opposite the bodies 1Ra and 1La respectively. The other ends of the turnbuckles 1Rc and 1Lc opposite the links are rotatably coupled to parts of the suspension arms.

A plurality of light interrupters are provided with the vehicle height sensors H1R and H1L for detecting the vehicle height displacement as 4-bit data by operating a disc so as to switch on and off the light interrupters in response to changes in the vehicle height, thus outputting a digital signal. The disc is substantially provided coaxial with the center shaft of the vehicle height sensor and defines a slit thereon.

The following is an explanation of air suspensions S1R, S1L, S2R and S2L. The air suspension S2L is provided between the left rear suspension arm and the vehicle body in parallel with a suspension spring (not shown). The air suspension S2L includes a main air chamber S2La functioning as an air spring, an auxiliary air chamber S2Lb, a shock absorber S2Lc, and an actuator A2L for altering the spring constant of the air spring and damping force of the shock absorber. Other air suspensions S1R, S1L and S2R have the same construction and function as the air suspension S2L, and are provided for the right front wheel, the left front wheel, and the right rear wheel, respectively.

A compressed air feed and discharge system 10 connected to each air spring of the air suspensions S1R, S1L, S2R and S2L operates a motor 10a to drive a compressor 10b for generating compressed air. The compressed air blows from the compressor 10b to an air drier 10d via a check valve 10c. The air drier 10d dries the compressed air supplied for the air suspensions S1R, S1L, S2R and S2L, and protects every part of the air suspensions S1R, S1L, S2R and S2L from moisture. The air drier 10d also prevents abnormal pressure changes which would accompany phase changes in main air chambers S1Ra, S1La, S2Ra and S2La and auxiliary air chambers S1Rb, S1Lb, S2Rb and S2Lb of the air suspensions. In a check valve 10e, the compressed air blows from the compressor 10b side to each of the air suspensions S1R, S1L, S2R and S2L side. The check valve 10e opens its checking portion in feeding the compressed air, and closes it in discharging the compressed air, thus discharging the compressed air only through the fixed portion thereof. A discharging valve 10f is an electromagnetic valve of 2-port 2-position spring off-set type. The discharging valve 10f is normally in the closed position as shown in FIG. 2. In discharging the compressed air from the air suspensions S1R, S1L, S2R and S2L, the valve 10f is open to discharge the compressed air to the atmosphere via the check valve 10e and the air drier 10d.

Air spring feed and discharge valves V1R, V1L, V2R and V2L function to adjust the vehicle height, and are provided between the air suspensions S1R, S1L, S2R and S2L, and the above-mentioned compressed air feed and discharge system 10, respectively. The air spring feed and discharge valves V1R, V1L, V2R and V2L are electromagnetic valves of 2-port 2-position spring off-set type. These valves are normally in the closed positions shown in FIG. 2, and are open in adjusting the vehicle height. When the air spring feed and discharge valves V1R, V1L, V2R and V2L are open, the main air chambers S1Ra, S1La, S2Ra and S2La are connected with the compressed air feed and discharge system 10. If the compressed air is fed from the system 10, the volumes in the main air chambers S1Ra, S1La, S2Ra, and S2La are increased so as to raise the vehicle height, and if the air is discharged because of the vehicle weight itself, the volumes thereof are decreased so as to lower the vehicle height. On the other hand, if the feed and discharge valves V1R, V1L, V2R and V2L are closed, the vehicle height remains unchanged. As described above, it is possible to change the volumes of the main air chambers S1Ra, S1La, S2Ra and S2La of the air suspensions so as to adjust the vehicle height by operating the discharge valve 10f and the air spring feed and discharge valves V1R, V1L, V2R and V2L.

A speed sensor SE1 is provided, for example, in a speedometer and outputs a pulse signal in response to the vehicle speed. The signals outputted from the vehicle height sensors H1R and H1L and the speed sensor SE1 are inputted to an Electronic Control Unit (ECU) 4. The ECU 4 derives data from the signals to process them and outputs a control signal to the actuators A1R, A1L, A2R and A2L of the air suspensions, to the air spring feed and discharge valves V1R, V1L, V2R and V2L, and to the motor 10a and the discharging valve 10f of the compressed air feed and discharge system 10 so as to optimally control them.

Figure 3:
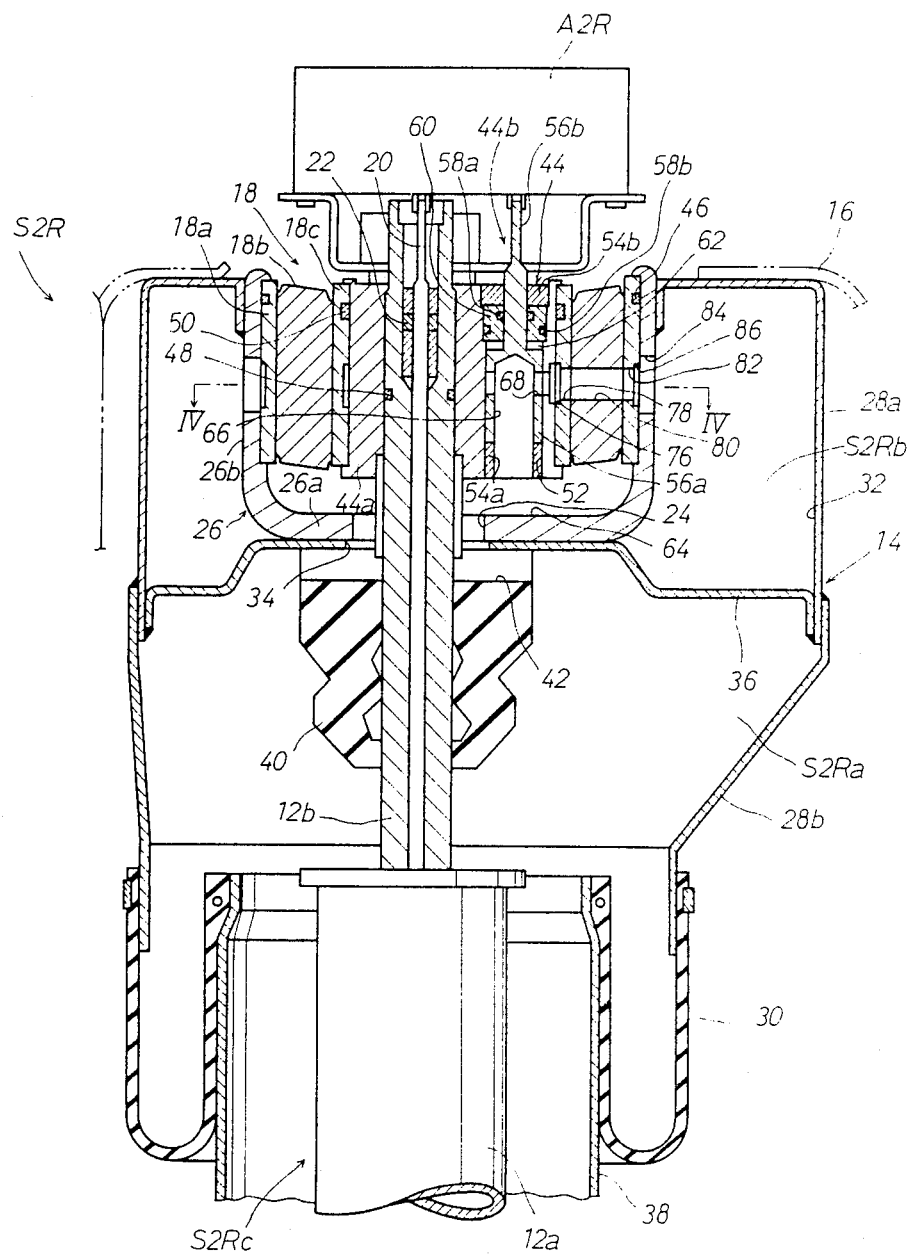
FIG. 3 is a longitudinal cross-section showing main parts of an air suspension adapted to the embodiment.
Figure 4:
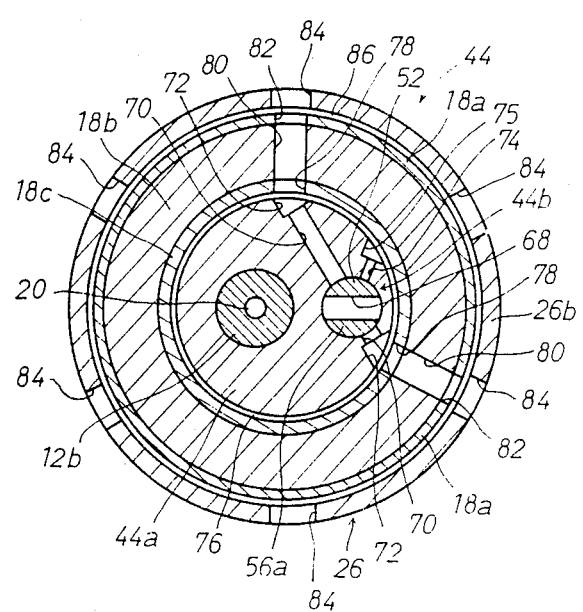
FIG. 4 is a cross-sectional view of FIG. 3 taken along line IV—IV.

The following is an explanation of the main part of the air suspensions S1R, S1L, S2R and S2L based on FIGS. 3 and 4. Since each suspension has the same construction as the others, here, the right rear air suspension S2R is described in detail.

The air suspension S2R includes a shock absorber S2Rc having a piston and a cylinder 12a, and an air spring unit 14 provided in connection with the shock absorber S2Rc, as shown in FIG. 3.

An axle (not shown) is supported at the lower end of the cylinder 12a of the shock absorber S2Rc. An elastic cylindrical assembly 18 for elastically supporting a piston rod 12b to the vehicle body 16 is provided at the upper end of the piston rod 12b extending from the piston (not shown) slidably fitted in the cylinder 12a. The shock absorber S2Rc controls its damping force by operating on the valve function of the piston. A control rod 20 for controlling the damping force is fluid-tightly and rotatably fitted with a sealing member 22 in the piston rod 12b.

The air spring unit 14 has a chamber 32 which is defined by a circumferential member 26, an upper housing member 28a, a lower housing member 28b, and a diaphragm 30. The circumferential member 26 includes a bottom 26a having an opening 24, in which the piston rod 12b is inserted, and a wall 26b rising from the peripheral portion of the bottom 26a. The upper housing member 28a covers the circumferential member 26 and is secured on the vehicle body. The lower housing member 28b is open at the lower end and is coupled to the lower end of the upper housing member 28a. The diaphragm 30 includes an elastic material which closes the lower end of the lower housing member 28b. The chamber 32 is divided into a lower main air chamber S2Ra and an upper auxiliary air chamber S2Lb by a partition member 36, which is secured on the bottom 26a of the circumferential member 26 and which has an opening 34 corresponding to the opening 24 provided in the bottom 26a. Both the chambers S2Ra and S2Rb are filled with compressed air. The partition member 36 is provided with a buffer rubber 40 which can be brought into contact with the upper end of the cylinder 12a. The buffer rubber 40 has a passage 42 for connecting the openings 24 and 34 to the main air chamber S2Ra. The elastic cylindrical assembly 18 is disposed inside the circumferential member 26 whose wall 26b defines the inside circumferential surface of the auxiliary air chamber S2Rb, in such a manner that the assembly 18 surrounds the piston rod 12b.

The cylindrical elastic assembly 18 is provided with a valve unit 44 for controlling the connection of both the air chambers S2Ra and S2Rb. The assembly 18 includes an outer cylinder 18a, a cylindrical elastic member 18b and an inner cylinder 18c which are disposed concentrically to each other. The cylindrical elastic member 18b is secured to both the cylinders 18a and 18c. The outer cylinder 18a is press-fitted on the wall 26b of the circumferential member 26 secured on the vehicle body by means of the upper housing member 28a. A valve casing 44a of the valve unit 44, in which the piston rod 12b is inserted, is secured on the inner cylinder 18c. Since the piston rod 12b is secured on the valve casing 44a, the piston rod is elastically connected to the vehicle body by means of the cylindrical elastic assembly 18. An annular air sealing member 46 is tightly packed in between the outer cylinder 18a and the wall 26b of the member 26. An annular air sealing member 48 is tightly packed in between the piston rod 12b and the valve casing 44a. An annular air sealing member 50 is tightly packed in between the inner cylinder 18c and the valve casing 44a.

The valve casing 44a has a hole 52 which is open at both its ends and which extends in parallel with the piston rod 12b. A rotary valve 44b is rotatably supported in the hole 52. The valve 44b includes a main portion 56a, which can be brought into contact with a lower positioning ring 54a provided at the lower end of the hole 52, and a small-diameter operating portion 56b projecting from the main portion above the elastic cylindrical assembly 18. An upper positioning ring 54b is provided at the upper end of the hole 52 and cooperates with the lower positioning ring 54a to prevent the valve 44b from dropping out of the hole 52. An annular sealing base 60, holding an inner air sealing member 58a and an outer air sealing member 58b for tightly closing the hole 52, is provided between the upper positioning ring 54b and the main portion 56a of the valve 44b. A friction reducer 62 for smoothing the revolution of the valve 44b, when the main portion 56a of the valve is pushed to the sealing base 60 by air pressure, is provided between the sealing base 66 and the main portion 56a of the valve 44b.

A chamber 64 is formed in the lower portion of the elastic cylindrical assembly 18 and is connected with the main air chamber S2Ra by means of the openings 24 and 34 and the passage 42 of the buffer rubber 40. The main portion 56a of the valve 44b has a recess 66 open to the chamber 64, and has a connection passage 68 extending through the main portion 56a in a diametrical direction thereof across the recess 66.

The valve casing 56b, which houses the valve 56a, has a pair of air passages 70, each of which can connect at one end with the connection passage 68, as shown in FIG. 4. The air passages 70 extend outwards in a diametrical direction of the hole 52 toward the peripheral surface of the valve 44b. The other end of each air passage 70 is open to the peripheral surface of the valve casing 44a through a face hole 72. An air passage 74, which can connect at one end with the connection passage 68, extends on the substantially same plane as the pair of air passages 70 toward the peripheral surface of the valve casing 44a, between the air passages 70. The diameter of the air passage 74 is smaller than that of each of the air passages 70. The other end of the air passage 74 is open to the peripheral surface of the valve casing 44a through a face hole 75. The inside circumferential surface of the inner cylinder 18c, covering the peripheral surface of the valve casing 44a, has an annular recess 76 which surrounds the peripheral surface of the valve casing 44a in order to connect the face holes 72 and 75 of the air passages 70 and 74 to each other.

The inner cylinder 18c has openings 78 which are open to the recess 76 which constitutes an annular air passage. The cylindrical elastic member 18b has through holes 80, which extend outwards in the radial direction of the member 18b corresponding to the openings 78. The through holes 80 are open to the peripheral surface of the outer cylinder 18a through openings 82 of the cylinder so that the openings 78 and 82 and the through holes 80 define an air passage including the air passages 70 and extending through the elastic cylindrical assembly 18.

The peripheral surface of the wall 26b of the circumferential member 26 covering the outer cylinder 18a is provided with plural openings 84, which are located at equal intervals in the circumferential direction of the member 26 and which are open to the auxiliary air chamber S2Rb so as to connect the openings 78 and 82 and the through holes 80 with the auxiliary air chamber S2Rb. The peripheral surface of the outer cylinder 18a is provided with an annular recess 86, which surrounds the outer cylinder at the openings 82, so as to connect the openings 84, 78 and 82 and the through holes 80 to each other. The openings 84 are open to the recess 86 constituting an annular air passage.

In the embodiment shown in FIG. 4, the positions of the openings 78 and 82 and the through holes 80 are defined by the positions of the two air passages 70 of the valve casing 44a. The air passages 70 and 74 can be optionally provided in positions in the circumferential direction of the elastic member 18b since the annular recess 76, with which the air passages 70 and 74 are connected, is formed between the inner cylinder 18c and the valve casing 44a.

The control rod 20 for controlling the damping force of the shock absorber S2Rc, and the actuator A2R for rotating the rotary valve 44b of the valve unit 44, are provided at the upper end of the piston rod 12b, as shown FIG. 3.

Since the air suspension S2R has the above-mentioned construction, the air suspension functions as described hereinafter.

When the valve 44a is kept in a closed position as shown in FIG. 4 so that the connection passage 68 of the valve disconnects from any of the air passages 70 and 74 of the valve casing 44a, the main air chamber S2Ra and the auxiliary air chamber S2Rb are disconnected from each other, thus the spring constant of the suspension S2R is set at a large value.

When the actuator A2R rotates the valve 44b into such a position that the connection passage 68 of the valve connects with the large-diameter air passages 70 of the valve casing 44a, the main air camber S2Ra is connected with the auxiliary air chamber S2Rb through the connection passage 68, the large-diameter air passages 70, the openings 78 and 82 and the through holes 80 of the elastic assembly 18 and the openings 84, thus the spring constant of the suspension S2R is set at a small value.

When the valve 44b is rotated into such a position by the actuator A2R that the connection passage 68 of the valve connects with the small-diameter air passage 74 of the valve casing 44a, the main air chamber S2Ra is connected with the auxiliary air chamber S2Rb through the connection passage 68, the small-diameter air passage 74, the annular recess 76, the openings 78 and 82 and the through holes 80 of the elastic assembly 18 and the openings 84, thus the spring constant of the suspension S2R is set at an intermediate value. This is because the small-diameter air passage 74 provides a higher air flow resistance than the large-diameter air passages 70.

Figure 5:
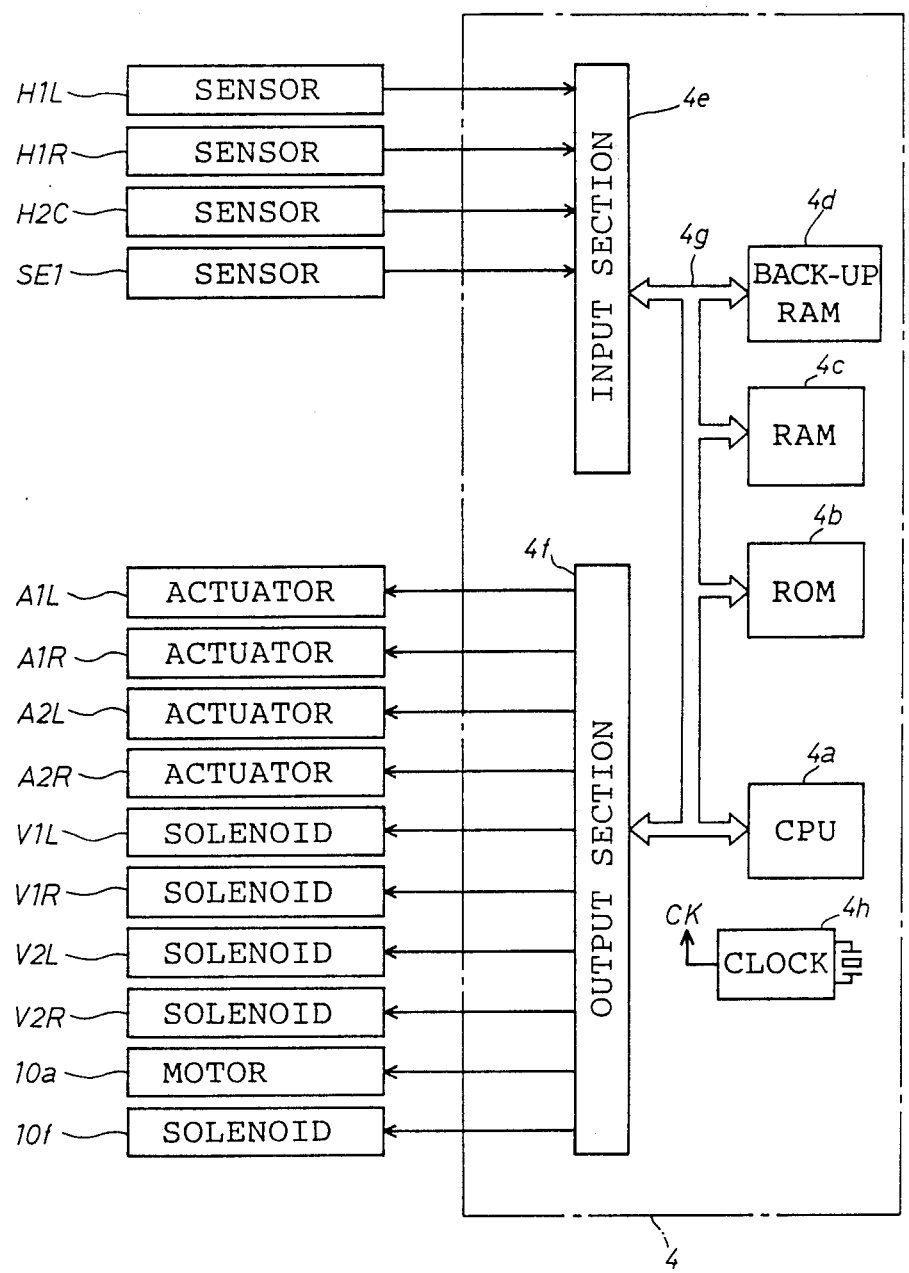
FIG. 5 is a block diagram for explaining the structure of an ECU (electronic control unit)

FIG. 5 shows the construction of the ECU 4. The ECU 4 includes a Central Processing Unit (CPU) 4a, a Read Only Memory (ROM) 4b, a Random Access Memory (RAM) 4c, a back-up Random Access Memory (back-up RAM) 4d, an input section 4e, an output section 4f, a bus line 4g and a clock circuit 4h. The CPU 4a receives output data from the sensors to process them according to a control program for controlling various apparatuses, means or the like. In the ROM 4b, the control program and initial data are stored. The RAM 4c functions to write and read out data, which the ECU 4 receives for the control. The backup RAM 4d is backed up by a battery so as to retain data even if the ignition key switch of the automobile is turned off. The input section 4e includes an input port (not shown), a waveshaping circuit (as occasion demands), a multiplexer which selectively sends out output signals from the sensors to the CPU 4a, and an A/D converter which converts an analog signal into a digital signal. The output section 4f includes an output port (not shown), and a drive circuit for driving the actuators according to the control signal of the CPU 4a as occasion demands. The bus line 4g connects the element, such as the CPU 4a, the ROM 4b, and the input and the output sections 4e and 4f, with each other so as to transmit data from each element. The clock circuit 4h sends out a clock signal for informing the control timing at predetermined time intervals to the CPU 4a, the ROM 4b, the RAM 4c, etc.

Figure 6:
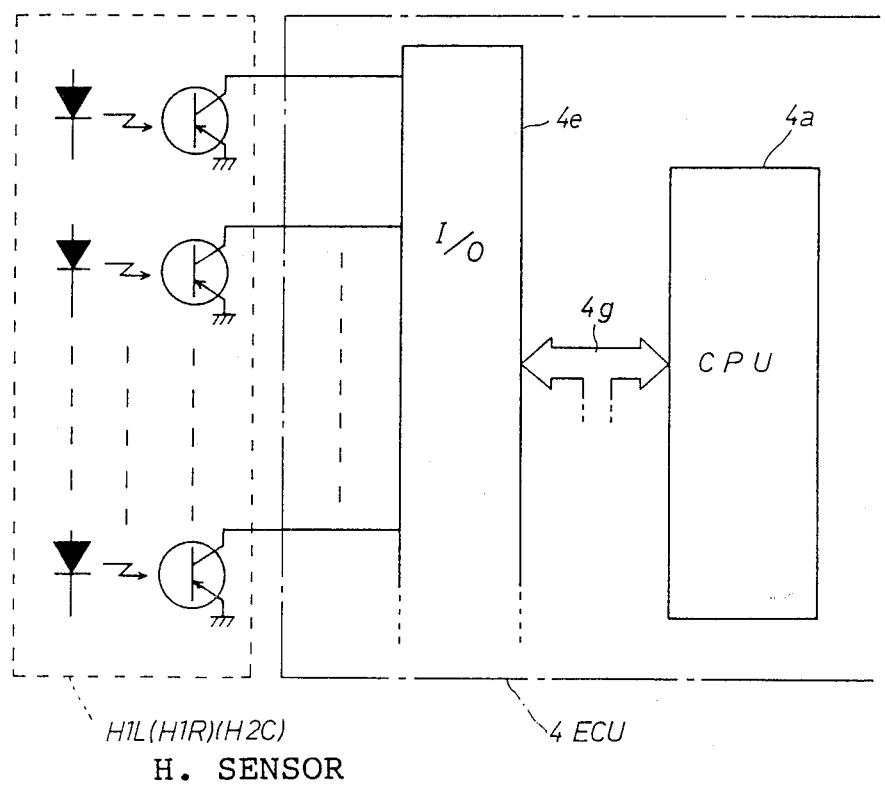
FIG. 6 is a block diagram showing a digital-type input circuit and a corresponding height sensor.
Figure 7:
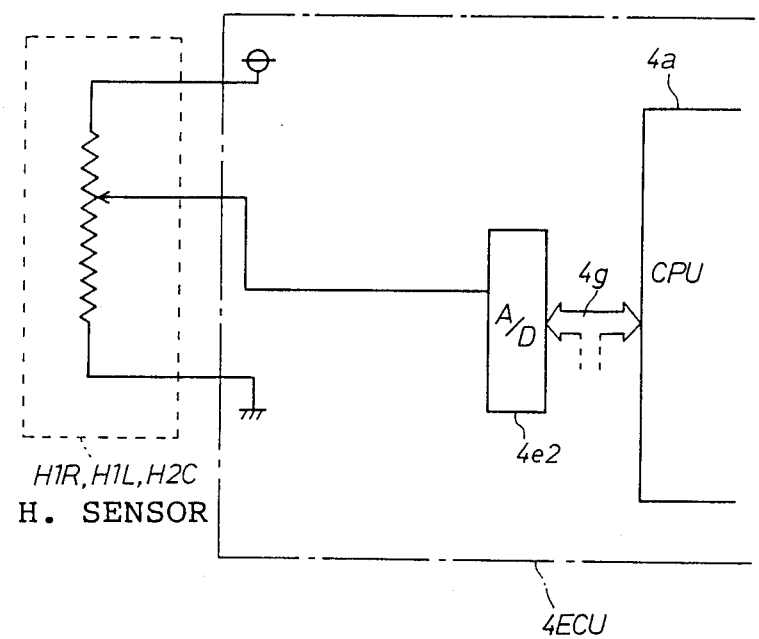
FIG. 7 is a block diagram showing an analog-type input circuit and a corresponding height sensor.

If the signals outputted from the vehicle height sensors H1R and H1L are 4-bit digital signals, they are transmitted to the CPU 4a via the input section 4e as shown in FIG. 6. On the contrary, if being analog signals, they are converted into digital ones and are then transmitted to the CPU 4a as shown in FIG. 7.

Figure 8:
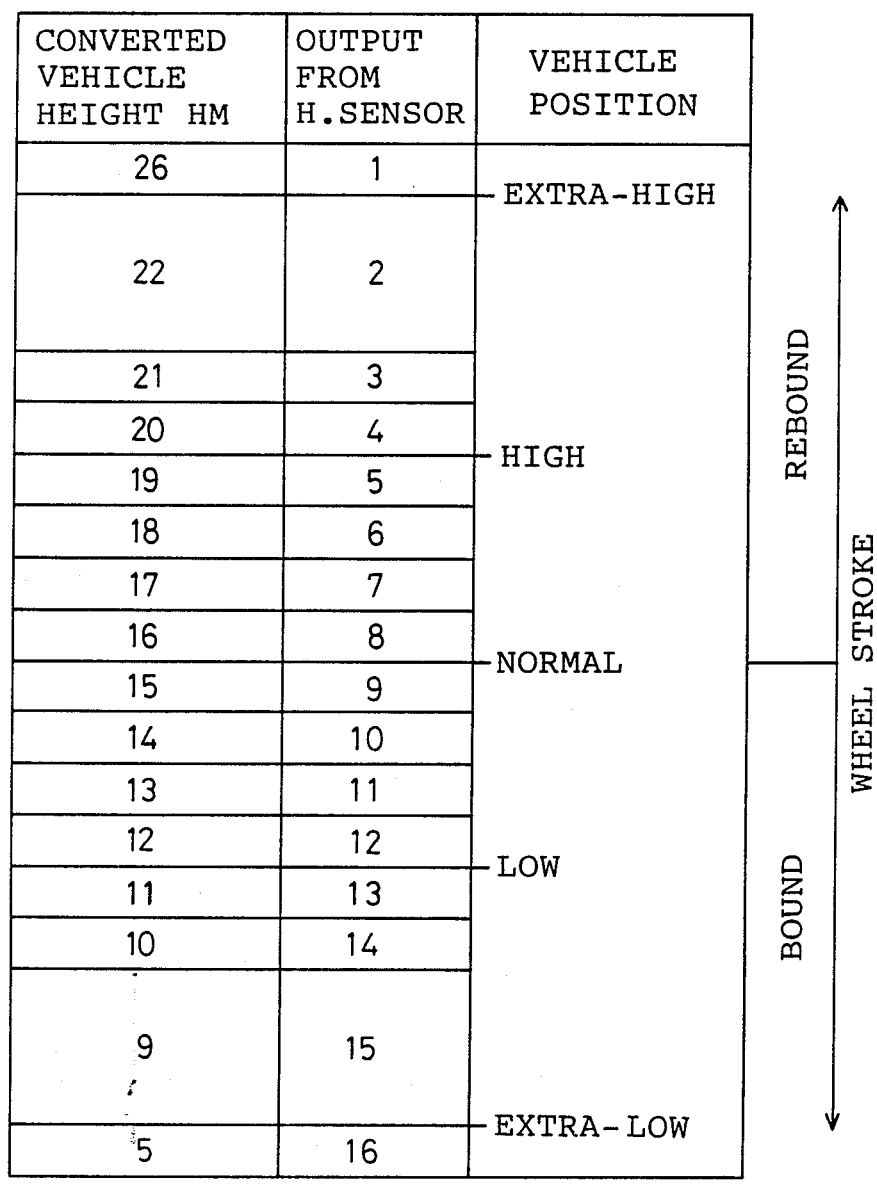
FIG. 8 is a table showing the relation between the output from the height sensor and the converted vehicle height indicative of the vehicle position.

Hereinunder is an explanation of converted vehicle height HM utilized to perform the control of the embodiment according to the present invention with reference to FIG. 8. The vehicle height sensors H1L and H1R noted as above detect the distance between the wheel and the vehicle body. As shown in FIG. 8, the sensor outputs 4-bit data of 16 levels, centering on the normal position of the vehicle height. When the wheel goes onto a bump, the output data go to a low or extra-low position indicative of the bounded state. When the wheel is caught in a dip, the output data go to high or extra-high position indicative of the rebounded state. A table shown in FIG. 8 defines the relation between the output data from the vehicle height sensor and the corresponding converted vehicle height HM, and the table is stored in a predetermined area in a ROM 4b. The ECU 4 converts the output from the front vehicle height sensors H1L and H1R into converted vehicle height HM on the basis of the table and performs an alteration operation of the suspension characteristic according to the converted vehicle height HM. Here, the value of the converted vehicle height HM is not arranged at equal intervals in the table, when the vehicle height is extra-high or extra-low position. This provision is for preventing the bottoming of the vehicle by quickly detecting large road irregularities and latering the suspension characteristic. Accordingly, the present embodiment performs the alteration control in such way that, the more the vehicle height approach to the extra-low position or extra-high position, the more rapidly the alteration control is performed.

Figure 9:
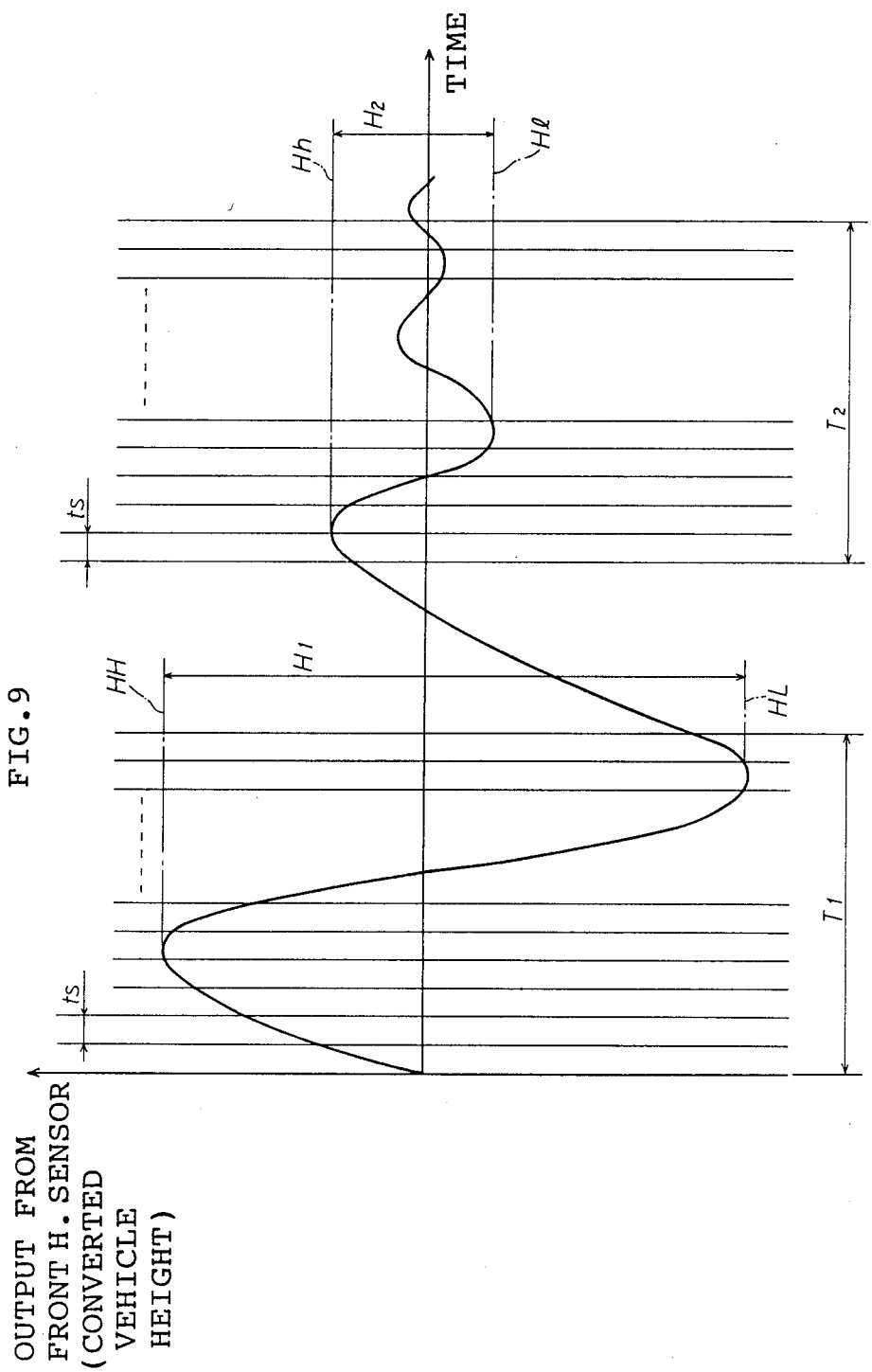
FIG. 9 is a timing chart explaining the conditions for determining and returning the suspension characteristic.
Figure 11A:
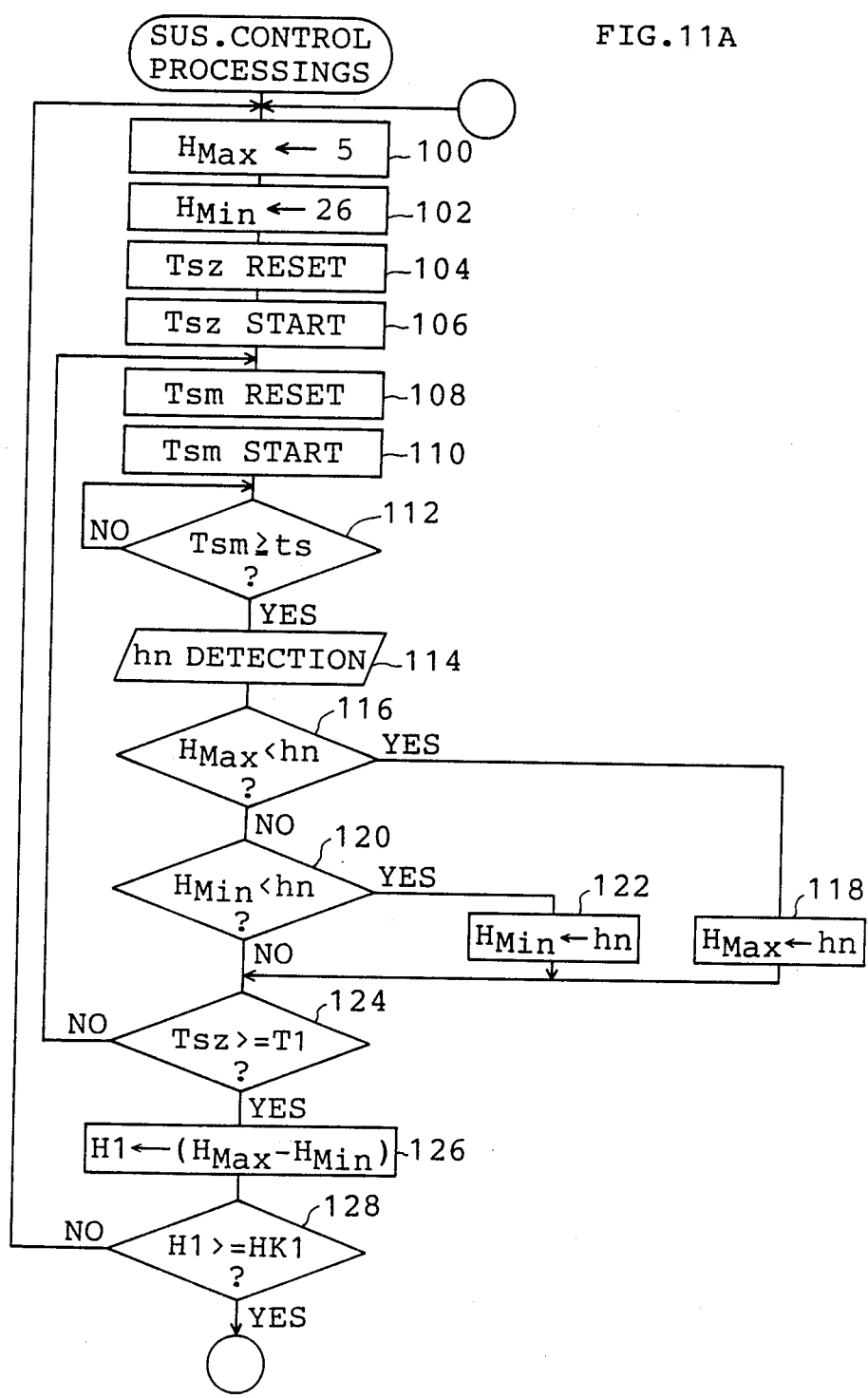
Figure 11B:
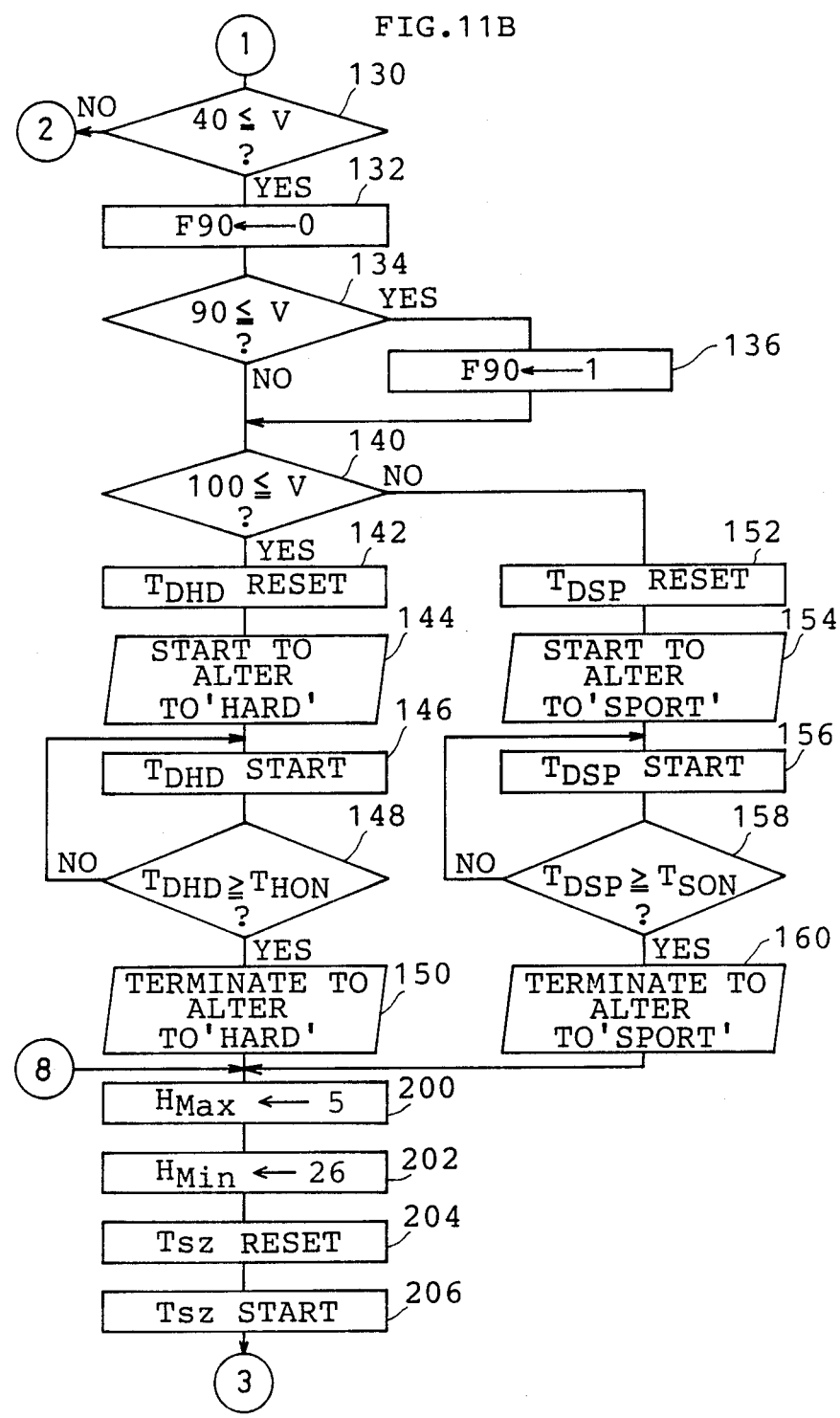
Figure 11C:
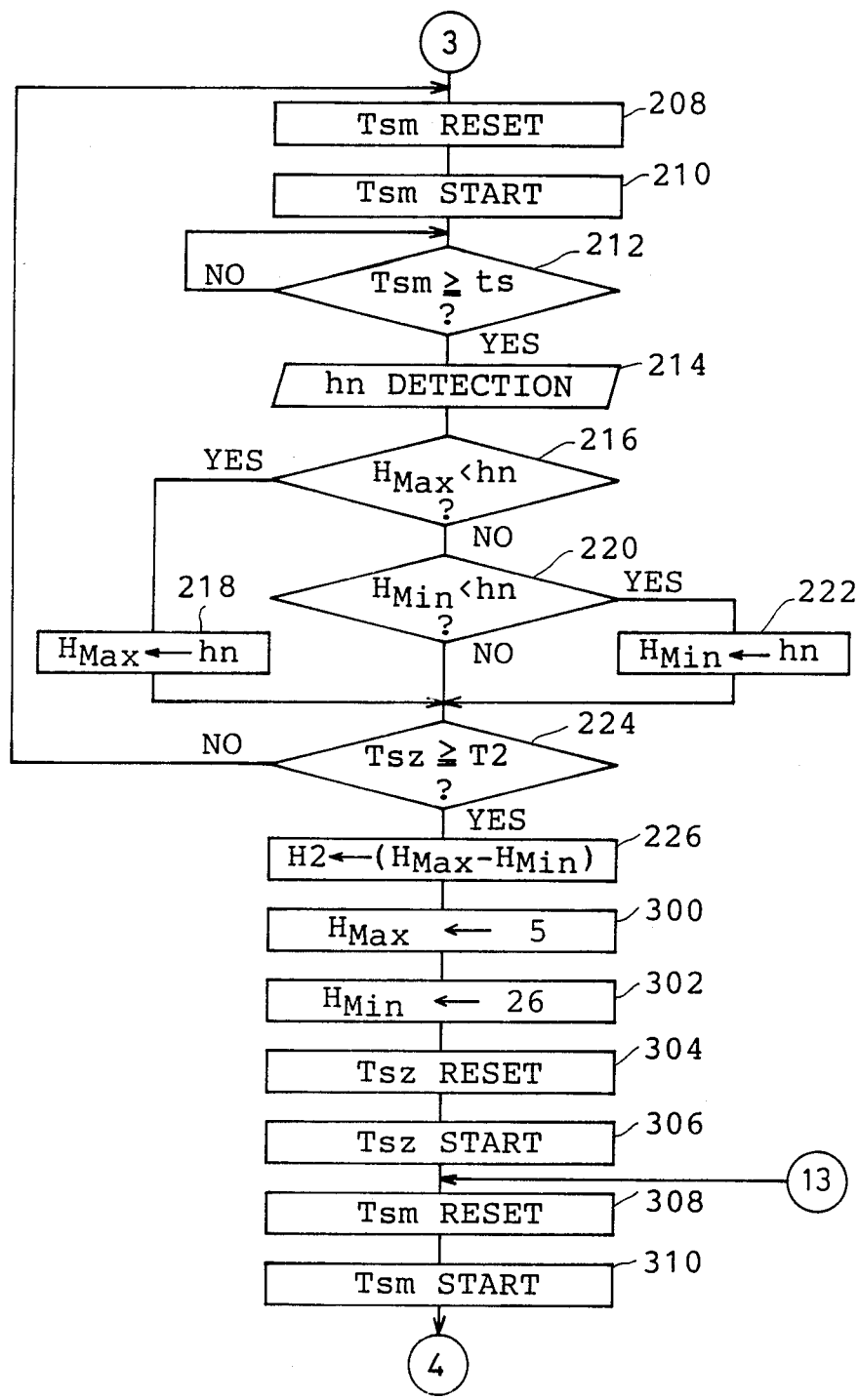
Figure 11D:
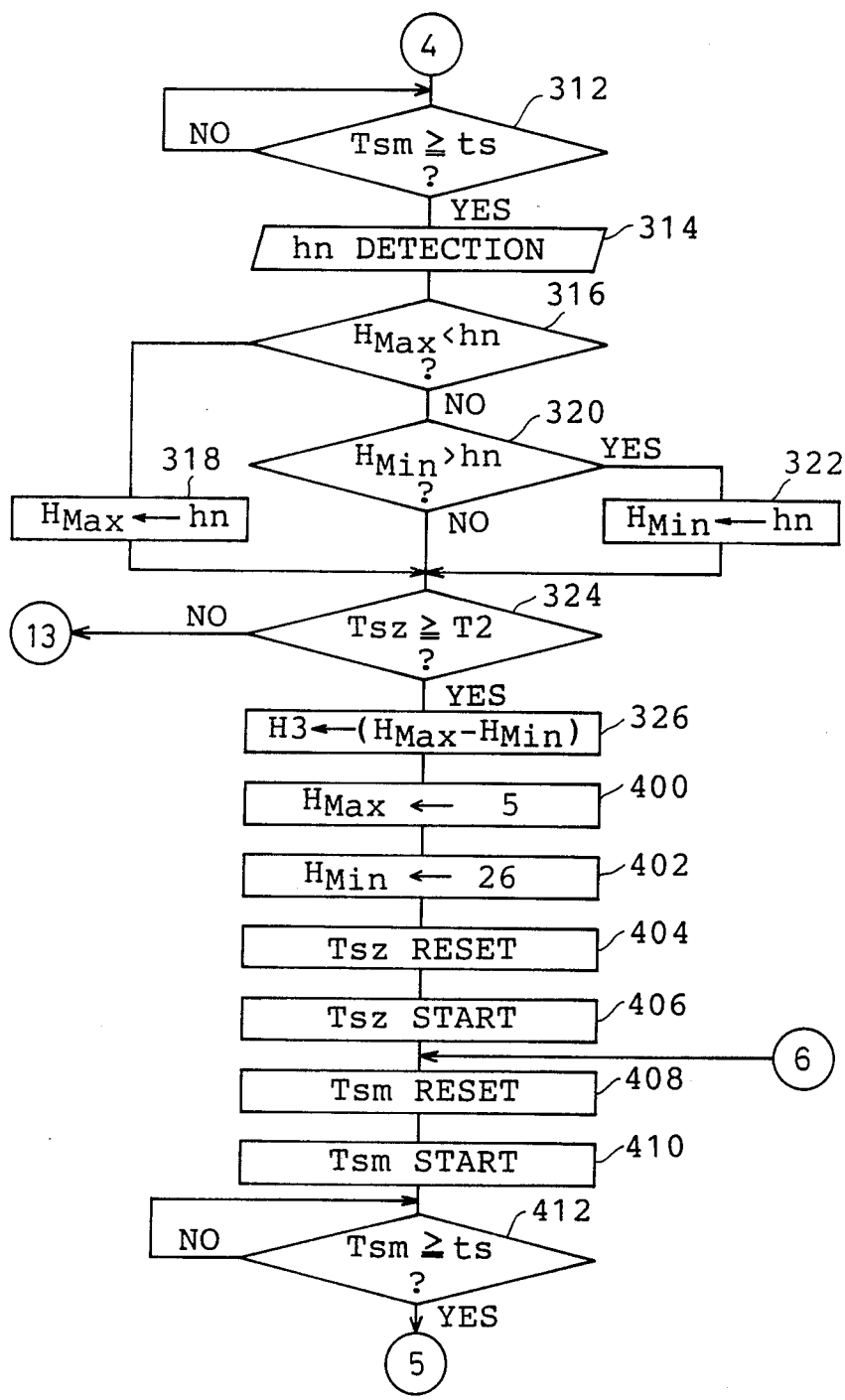
Figure 11E:
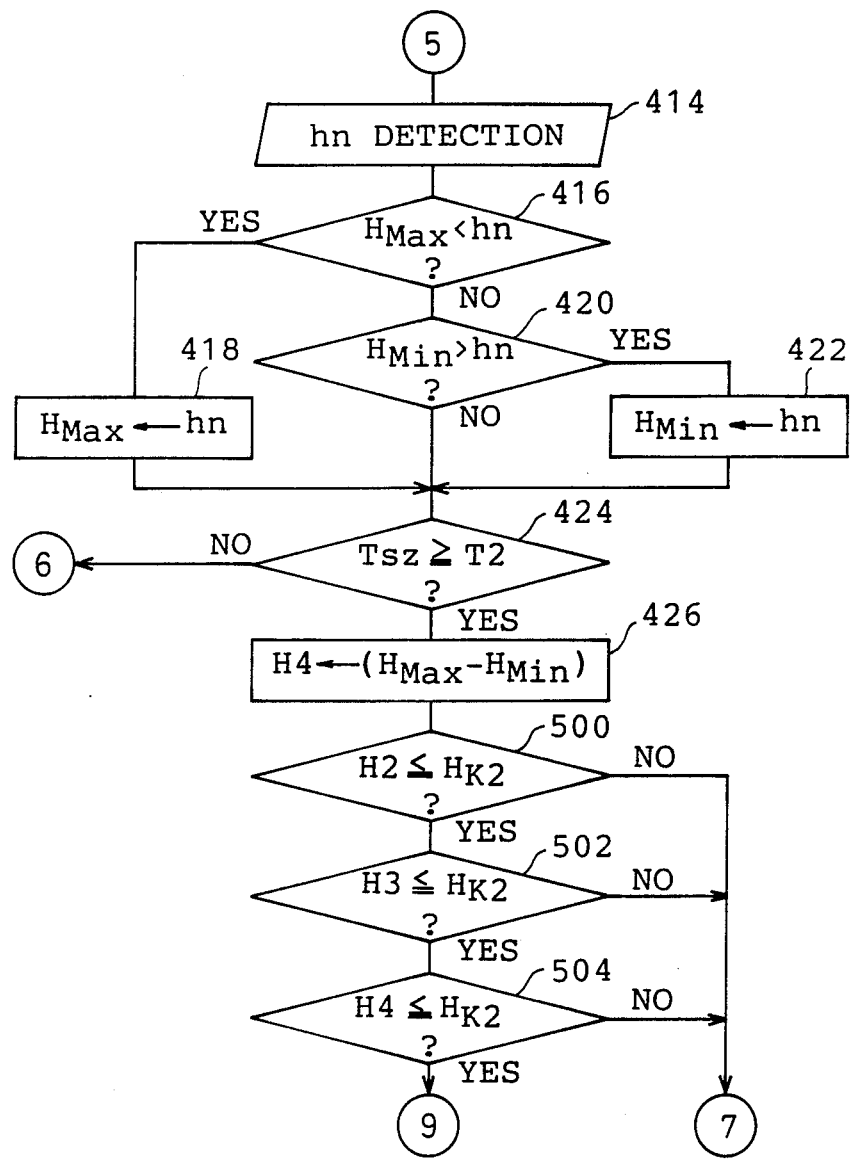
Figure 11G:
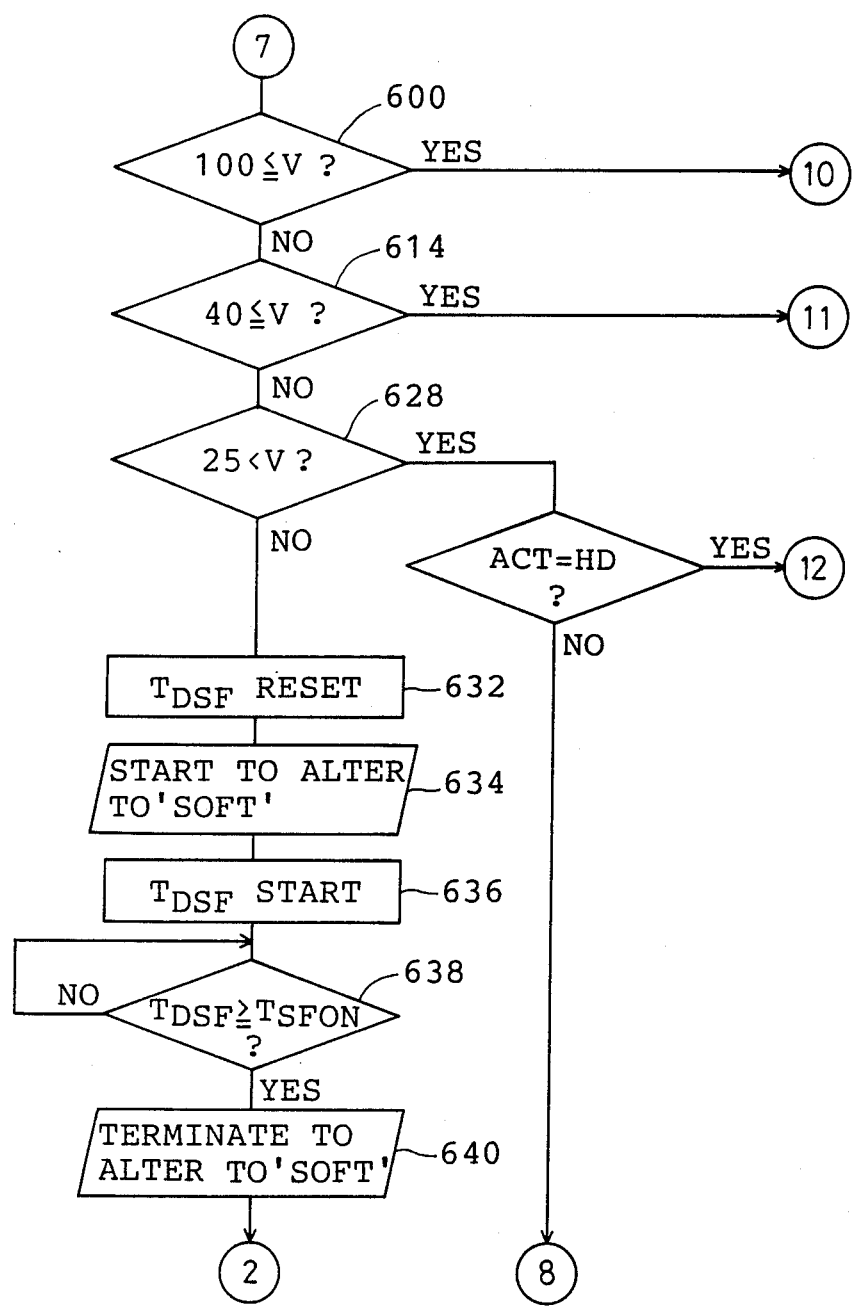
Figure 11H:
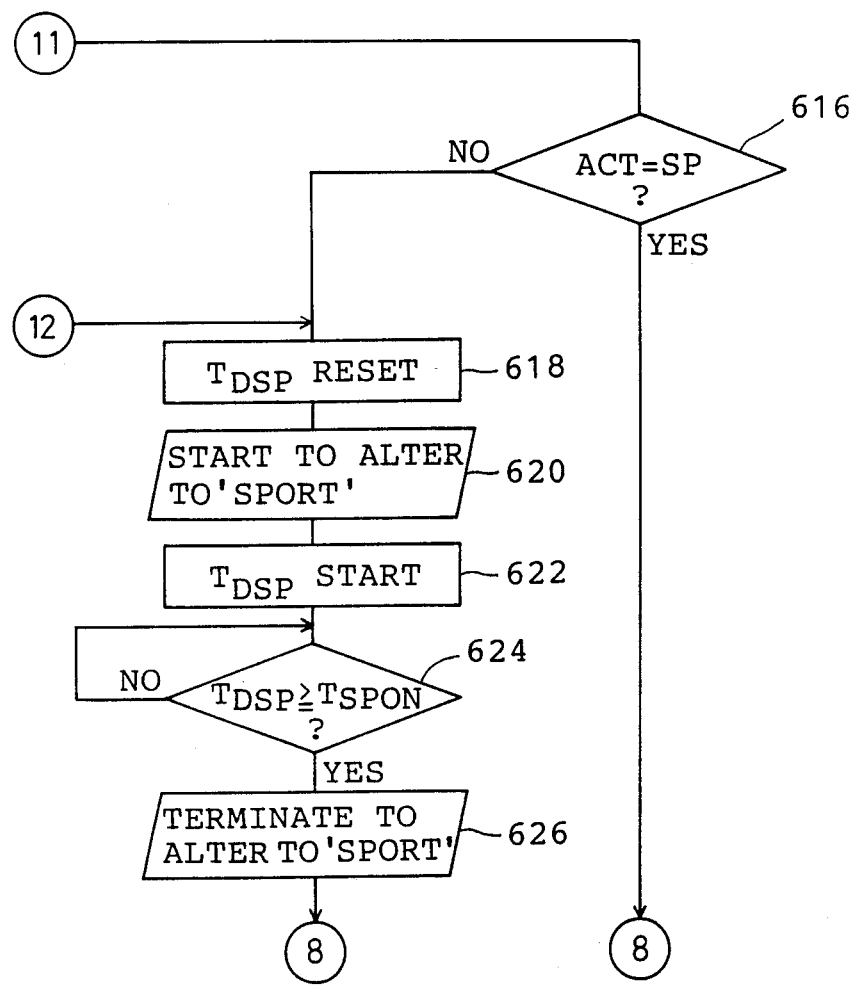
Figure 11I:
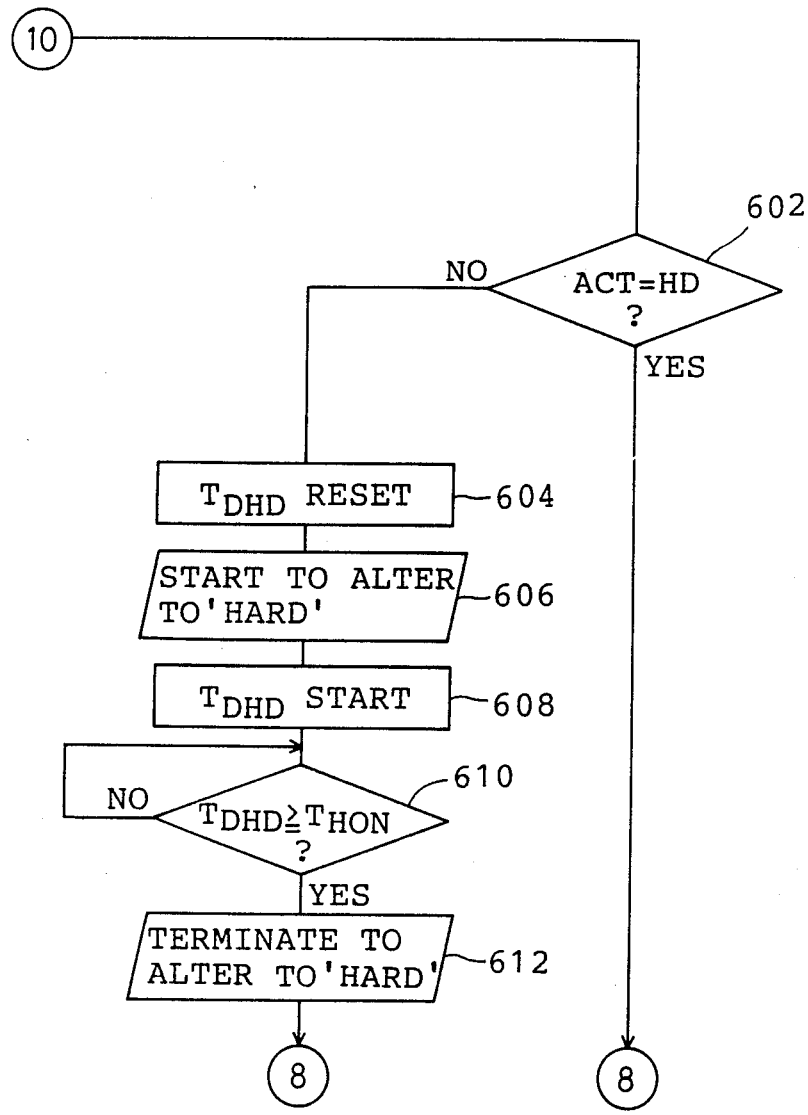

Hereinunder in an explanation of the relation among the vehicle height change, detection time interval, and determination time interval with reference to FIG. 9. As shown in FIG. 9, a time interval ts is a vehicle height detecting time interval for detecting the output from the vehicle height sensors H1L and H1R. The time interval may be preset to 8 msec., for example, in the embodiment. Furthermore, T1 is an alteration determination time interval for performing the determination if the suspension characteristic is to be altered. The time interval T1 is obtained from the following formula:

$$T1 = (N1-1) \times ts \tag{1}$$

here, N1 represents the number to times that the alteration vehicle height is detected, it is 64 times according to the present embodiment. Therefore, the time interval T1 is made approximately 0.5 sec., that is about half of the cycle time of the resonant vibration of sprung mass showing a value 0.8 sec., since the resonant vibration of sprung mass has a frequency ranging in 1.2–1.3 Hz.

For altering the suspension characteristic, first operation is to calculate the maximum vehicle height change H1 within the alteration determination time interval T1 from the maximum vehicle height HH and the minimum vehicle height as follows:

$$H1 = HH - HL \tag{2}$$

here, each vehicle height in the formula (2) represents converted vehicle height corresponding to the detected vehicle height. If the maximum vehicle height change H1 is not less than an alteration determination reference value HK1, the suspension characteristic is altered from 'SOFT' state to 'SPORT' state, or in another case from 'SPORT' state to 'HARD' state. According to the present embodiment, the alteration determination reference valaue HK1 (FIG. 8) is 11, in the converted vehicle height unit.

A time interval T2 indicates a time interval for determining if the suspension characteristic is to be returned or not to be returned, and the returning time interval T2 is obtained from the following formula:

$$T2 = (N2-1) \times ts \tag{3}$$

here, N2 represents the number of times that the vehicle height data is detected. Here, it is detected 83 times according to the present embodiment. Therefore, the time interval T2 is set to approximately 0.66 sec., that is smaller than the cycle time 0.8 sec., cycle time range of the resonant vibration of spring mass.

For returning the suspension characteristic, the first operation is to calculate the maximum vehicle height change H2 within the returning determination time interval T2, from the maximum vehicle height change Hh and the minimum vehicle height Hl:

$$H2 = Hh - Hl \tag{4}$$

here, each vehicle height in the formula also represents converted vehicle height corresponding to the detected vehicle height. If the maximum vehicle height change H2 falls below the returning determination reference value HK2 three times in a row, the suspension characteristic is altered from 'SPORT' state to 'SOFT' state, or in another case, from 'HARD' state to 'SPORT' state. According to the present embodiment, the alteration determination reference value HK2 (FIG. 8) is 8 in the converted vehicle height unit.

A speed responsive mechanism adapted to the present embodiment is explained on the basis of FIG. 10. FIG. 10 shows a table defining the relation between the suspension characteristic and vehicle speed in the case of a rough road and a flat road. If the vehicle is determined running on the rough road, the suspension characteristic is set to 'SOFT' state in response to the vehicle speed less than 25 Km/h, and set to 'SOFT' state in response to the vehicle speed not more than 40 Km/h during acceleration, set to 'SPORT' state in response to the vehicle speed not less than 40 Km/h but less than 100 Km/h, and the vehicle speed is altered to 'HARD' state in response to the vehicle speed not less than 100 Km/h. If the vehicle is decelerated and the vehicle speed is not less than 25 Km/h but less than 40 Km/h, the suspension characteristic is held to 'SPORT' state.

On the contrary, if the vehicle is determined to be running on the flat road surface, the suspension characteristic is set to 'SOFT' state in response to the vehicle speed less than 70 Km/h, and set to 'SOFT' state in response to the vehicle speed not less than 70 Km/h and less than 90 Km/h during acceleration, and is set to 'SPORT' state in response to the speed not less than 90 Km/h. In addition, if the vehicle is decelerated and the vehicle speed is within the range of not less than 70 Km/h but less than 90 Km/h, the suspension characteristic is held to 'SPORT' state.

The suspension characteristic varies depending on whether an accelerated condition or a decelerated condition exists for at the state changing speed range because the history of the alteration of the suspension characteristic is considered. For example, the suspension controller according to the present embodiment is not operated to alter the suspension characteristic to 'SOFT' state instantly when the vehicle once records the speed not less than 90 Km/h while running on a rough road, then decelerates to the range not less than 70 Km/h but less than 90 Km/h, and finally cruises on a flat surface.

Rather than being based on the amplitude (H1, H2) of the vibration, the determination for altering the suspension characteristic may be based on a first or second time derivatives (i.e., speed or acceleration) of the amplitude.

Suspension control process steps executed by the ECU 4 are explained hereinunder on the basis of the flow chart shown in FIGS. 11A-11I.

The vehicle adopting the present suspension controller is provided with switches for selecting the suspension control modes, i.e, 'AUTO' mode and 'MANUAL' mode. The present suspension control process steps start to be executed when the vehicle is started and accelerated, and 'AUTO' mode is selected by a driver. Following is the summary of the present suspension control process step.

(1) Vehicle height is detected at every vehicle height detection time interval ts, and the maximum vehicle height change H1 within the alteration determination time interval T1 is calculated, and then the suspension characteristic is altered to 'SPORT' state or 'HARD' state depending on the vehicle speed when the maximum vehicle height change H1 is not less than the alteration determination reference value HK1 within the time interval T1 (steps 100-160).

(2) The vehicle height is detected at every detection time intervals ts, and the maximum vehicle height change within the returning determination time interval T2 is calculated consecutively three times, and if every maximum vehicle height change H2, H3, and H4 is smaller than the returning determination reference value HK2, the suspension characteristic is returned to 'SOFT' state or 'SPORT' state depending on the vehicle speed (steps 200-534).

(3) If at least one of the maximum vehicle height changes H2, H3, and H4 mentioned in paragraph (2) is not less than the returning determination reference value HK2, the suspension characteristic is altered or kept unchanged (steps 600-640).

Hereinunder is a detailed explanation of the suspension control process steps described as above. At step 100, initialization is executed for substituting 5, i.e. the minimum value of the converted vehicle height HM, for the maximum vehicle height $H_{Max}$. At subsequent step 102, initialization if executed for substituting 26, i.e. the maximum value of the converted vehicle height HM, for the minimum vehicle height change. At step 104, a process step is executed for resetting the timer Tsz for counting the alteration determination time interval T1. At step 106, a process step is executed for starting the timer Tsz for counting the alteration determination time interval Tsz. At step 108, a process step is executed for resetting a timer Tsm for counting the vehicle height detection time interval ts. At step 110, a process step is executed for starting the timer Tsm for counting the vehicle height detection time interval. The process step being advanced to step 112, determination is made if the counted value in the timer Tsm becomes equal to or greater than the reference vehicle height detection time interval ts. If the counted value in the timer Tsm is not great enough, the next process step is delayed until the time interval ts is elapsed. On the other hand, if the time interval ts is elapsed, the process step is advanced to step 114 for detecting the output from the front height sensors H1L and H1R and converting it into the converted vehicle height data hn. Here, the vehicle height data hn may be converted from either output of the front vehicle height sensor H1L and H1R, averaged value of the right and left front vehicle height sensors, or the larger one of the two. At subsequent step 116, determination is made if the above-mentioned vehicle height data hn is greater than the maximum vehicle height data $H_{Max}$. If the vehicle height data hn is greater than the maximum vehicle height $H_{Max}$, the process step is advanced to step 118 for substituting the height data hn for the maximum vehicle height $H_{Max}$. In this way, process step is advanced to step 125. On the contrary, if the height data hn is not more than the maximum vehicle height $H_{Min}$, the process step is advanced to step 120 for determining if the height data hn is smaller than the minimum vehicle height data $H_{Min}$. If the determination is made that the height data hn is smaller than the minimum vehicle height $H_{Min}$, the process step is advanced to step 122 for substituting the height data hn for the minimum vehicle height $H_{Min}$. In this way, the process step is advanced to step 124. At step 124, determination is made if the counted value in the timer Tsz is not less than the alteration determination time interval T1. If the time interval T1 has not been elapsed, the process step returns to step 108 for repeatedly detecting the vehicle height. However, if the time interval T1 is elapsed, the process step is advanced to step 126 for calculating the maximum vehicle height change H1 within the time interval T1 by subtracting the minimum vehicle height change $H_{Min}$ from the maximum vehicle height change $H_{Max}$.

Process step being advanced to step 128, determination is made if the maximum vehicle height change H1 is not less than the reference alteration determination value HK1. If H1 is less than the value HK1, the process step returns to step 100. On the other hand, if H1 is not less than the value HK1, the process step is advanced to step 130. At step 130, determination is made if the current vehicle speed V is not less than 40 Km/h. If the current vehicle speed V is less than 40 Km/h, the process step returns to step 100. On the other hand, if the current vehicle speed V is not less than 40 Km/h, the process step is advanced to step 132 for resetting the vehicle speed detection flag F90. The flag F90 is set once the vehicle speed V exceeds 90 Km/h. At subsequent step 134, determination is made if the vehicle speed V is not less than 90 Km/h. If the vehicle speed is not less than 90 Km/h, the process step is advanced to step 136 for setting the value of the vehicle speed detection flag F90 to "1", and the process step is advanced to step 140. However, if the vehicle speed V is determined less than 90 Km/h, the process step is advanced to step 140. At step 140, determination is made if the vehicle speed V is not less than 100 Km/h. If the vehicle speed V is not less than 100 Km/h, the process step is advanced to step 142, for altering the suspension characteristic to 'HARD' state on the basis of the table for a rough road (see FIG. 10). Step 142 is a process step at which timer TDHD for counting an alteration duration time interval THON to 'HARD' state is reset. At subsequent step 144, the action is initiated for altering the suspension characteristic to 'HARD' state by increasing the spring constant and damping force of the shock absorber of the air suspensions S1L, S1R, S2L and S2R that have been explained hereinabove. More concretely, at step 144, the rotary vale 44b and the control rod 20 are started to be rotated by the operation of the actuator A1L, A1R, A2L, and A2R. At step 146, the timer TDHD is started to count the alteration time interval. After that, the process step is advance to step 148 and determination is made if the counted value in the timer TDHD is not less than the time interval THON.

If the determination is made that the time interval THON is elapsed, the process step is advanced to step 150 for terminating the action to alter the suspension characteristic to 'HARD' state, namely, the rotation of the actuator is stopped.

However, if the vehicle speed V is determined less than 100 Km/h, the process step is advanced to step 152 for altering the suspension characteristic to 'SPORT' state on the basis of the table for the rough road in the manner as explained previously. More concretely, the process steps (steps 152, 154, 156, 158, and 160) are executed for setting the suspension characteristic to an intermediate value of the spring constant or damping force of shock absorbers of the air suspensions S1L, S1R, S2L and S2R to rotate the rotary valve 44b or the control rod 20 by means of the actuators A1L, A1R, A2L and A2R.

After the above process steps are executed, the process step is advanced to step 200 for calculating the maximum vehicle height change H2 within the returning determination time interval T2 (steps 200–226).

The process step is advanced to step 300, and the process steps (steps 300–326) are executed for calculating the maximum vehicle height change H3 within the second returning determination time interval T2.

The process step is advanced to step 400, and process steps (steps 400–426) are executed for calculating the maximum vehicle height change H4 within the third returning determination time interval T2. Since each of the abovementioned three groups of process steps is similar to the process steps for calculating the maximum vehicle height change H1 within the alteration time interval T1, a detailed explanation of each such process step may be found with reference to those for H1.

At steps 500, 502, and 504, a determination is made if each of the maximum vehicle height changes H2, H3, and H4 is not more than a returning determination reference value HK2 respectively.

If the determination is made that each of the maximum vehicle height changes H2, H3 and H4 within the returning determination time interval T2 is not more than the returning determination reference value HK2, it is judged that the vibration of the vehicle body is sufficiently damped due to the suspension characteristic having been altered, and then the process step is advanced to step 506. If the vehicle speed V is not less than 90 Km/h and the suspension characteristic is not in 'SPORT' state (steps 506, 508), the process step returns to step 100. However, when the vehicle speed is not less than 90 Km/h and the suspension characteristic is not in 'SPORT' state, the process step is performed for returning the suspension characteristic to the 'SPORT' (Steps 506, 508, 510, 512, 514, 516, and 518) state, and then the process step returns to step 100. If the vehicle speed V is not less than 70 Km/h but less than 90 Km/h or if the vehicle speed has once exceeded 90 Km/h in the past, the suspension characteristic returns to 'SPORT' state (steps 506, 520, 522, 510, 512, 514, 516, 518 and 524), and the process step returns to step 100. However, if the vehicle speed V has not exceeded 90 Km/h in the past, the suspension characteristic is returned to 'SOFT' state (steps 506, 520, 522, 524, 526, 528, 530, 532, and 534). After that, the process step returns to step 100. In addition, if the vehicle speed V is below 70 Km/h, the suspension characteristic is returned to 'SOFT' state (steps 506, 520, 526, 528, 530, 532, 534). After that, the process step returns to step 100.

On the other hand, if at least one of the maximum vehicle height changes H2, H3, and H4 within the time interval T2 exceeds the returning determination reference value Hkz, determination is made that the vibration exerted to the vehicle body have been sufficiently damped due to the suspension characteristic having been altered. Therefore, the process step is advanced to step 600 and the following steps. If the vehicle speed V is not less than 100 Km/h and the suspension characteristic is in 'HARD' state (steps 600, 602), the process step is not advanced to the next step but returns to step 200. However, if the suspension characteristic is not in 'HARD' state, the alteration operation is performed to alter the suspension characteristic to 'HARD' state (steps 600, 602, 604, 606, 608, 610, and 612), and then the process step returns to step 200. If the vehicle speed V is not less than 40 Km/h but less than 100 Km/h and the suspension characteristic is in 'SPORT' state (steps 600, 614, 616), the process step returns to step 200. However, if the suspension characteristic is not 'SPORT' state, the alteration operation is performed to alter the suspension characteristic to 'SPORT' state (steps 600, 614, 616, 618, 620. 622, 624 and 626), and then the process step returns to step 200.

If the vehicle speed V is less than 40 Km/h but not less than 25 Km/h and if the suspension characteristic is in 'HARD' state. It is altered to 'SPORT' state (steps 600, 614, 628, 630, 618, 620, 624 and 626), and the process step returns to step 200.

If the suspension characteristic is not in 'HARD' state in the preceding case, the process step is not advanced to the next step but returns to step 200 (steps 600, 614, 628, 630).

Furthermore, if the vehicle speed V is 25 Km/h or less, the alteration operation is performed to alter the suspension characteristic to 'SOFT' state (step 600, 614, 628, 632, 634, 636, 638 640, and the process step returns to step 100). The process steps according to the present suspension control as explained above are repeatedly executed whenever the vehicle runs on the road surface.

Figure 12:
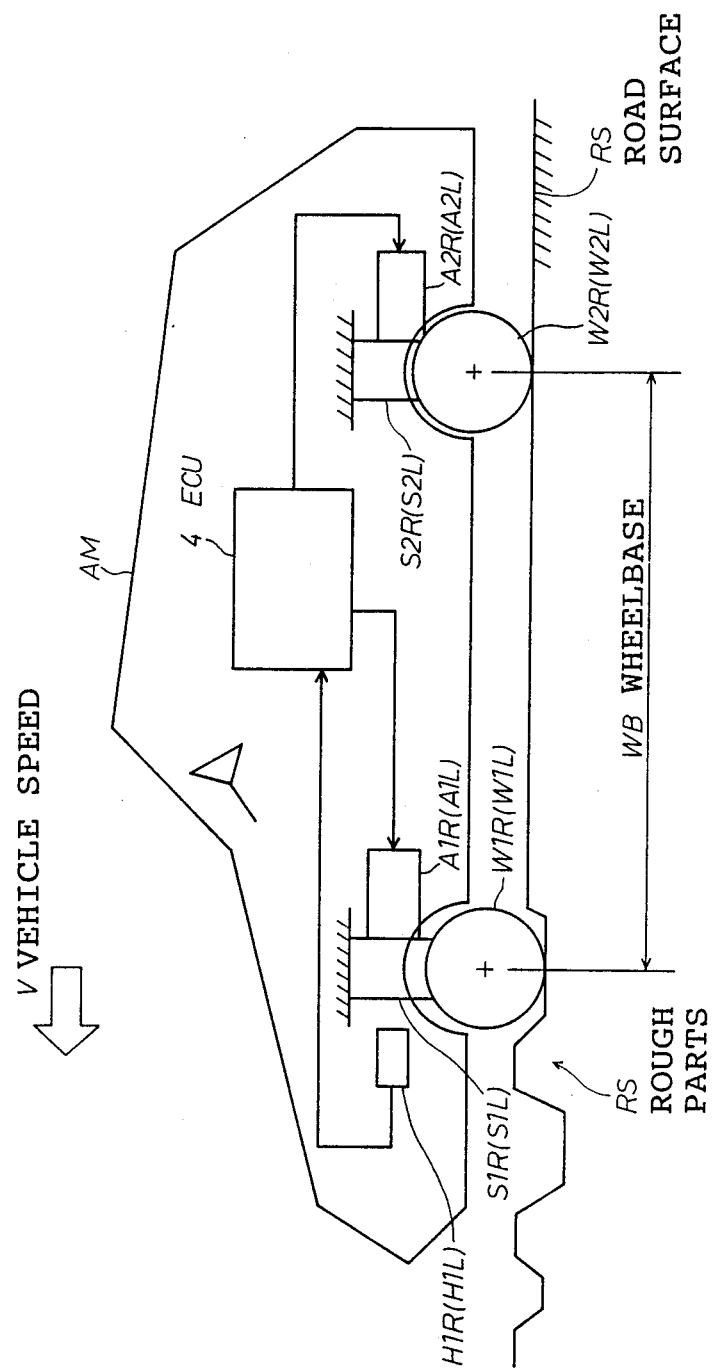
FIG. 12 is a schematic view showing a vehicle about to pass over rough parts on the road surface.

One example of control timing for executing suspension control process steps is explained hereinunder on the basis of FIGS. 12-14. FIG. 12 is a schematic view in which the front wheel W1R (or W1L) beings to move onto a rough part RP followed by the continuous rough parts of the road surface when a vehicle AM runs on a road surface RS at speed V Km/h.

FIGS. 13 and 14 are two timing charts for showing the changes in output from the front height sensors H1L and H1R, driving current from the suspension characteristic alteration actuators A1R, A1L, A2R and A2L, and the suspension characteristic in relation to the elapsed time when the vehicle is in the condition shown in FIG. 12.

Referring to FIG. 13, the maximum vehicle height change H0 within the alteration determination time interval T1 between a time point t1 and a time point t2 detected by the front height sensor H1L (or H1R) is smaller than the alteration determination reference value HK1, as far as the vehicle AM runs on a flat road surface RS shown in FIG. 12.

The time point t2 indicates a time point when a vehicle is in the condition shown in FIG. 12 in which the vehicle AM whose front wheel W1R (or W1L) begins to move onto the rough part RP. The maximum vehicle height change H1 with the time interval T1 between the time point t2 and a time point t3 detected from the height sensor H1L (or H1R) is made greater than the alteration determination reference value HK1, as shown in FIG. 13. More specifically, for the vehicle height data detected every detection time interval ts, the converted vehicle heights of the maximum vehicle height and the minimum vehicle height respectively take values 21 and 10 (according to FIG. 8) in this case, so the maximum vehicle height change H1 takes a value 11 which is same as the alteration determination reference value HK1. Therefore, the suspension characteristic alteration actuators A1R, A1L, A2R and A2L are started to be driven, or supplied with electricity, at the time point t3 and the suspension characteristic is altered from 'SOFT' state to 'SPORT' state at a time point t4, when a completion time interval Ta is elapsed from the time point t3. Each actuator is continuously driven up to a time point t5 when an actuator driving time interval Tb has elapsed from the time point t4. Since the suspension characteristic is altered to 'SPORT' state at the time point t4, the vibration exerted to the vehicle body is damped and the vibration of the output from the front height sensors H1L and H1R is reduced in the manner as as indicated by the solid line in FIG. 13. Unless the suspension characteristic is altered, output from the front height sensors H1L and H1R is not easily reduced as indicated by the broken line shown also in FIG. 13. For a returning determination time interval T2 from the time point t3 to a time point t6, the converted vehicle heights of the maximum vehicle height and the minimum vehicle height respectively take values 20 and 13, so the maximum vehicle height change H2 takes value 7 which is less than returning determination value HK2 of 8. Furthermore, for a returning determination time interval T2 from the time point t6 to a time point t7, the converted vehicle height changes of the maximum and the minimum vehicle height changes respectively take values 20 and 13, making the maximum vehicle height change H3 7 which is smaller than the returning determination reference value HK2 of 8. For another returning determination time interval T2 from the time point t7 and a time point t8, the converted vehicle height of the maximum and the minimum vehicle height change respectively take values 19 and 14, so the maximum vehicle height change H4 is 5 which is less than the returning determination reference value H2 of 8. Accordingly, the vibration exerted on the vehicle vehicle is judged to be sufficiently damped and the suspension characteristic alteration actuators A1R, A1L, A2R and A2L are stated to be driven at the time point t8. At a time point t9, the completion time interval Ta is elapsed from the time point t8, the suspension characteristic is altered from 'SPORT' to 'SOFT' state. Here, each actuator is continued to be driven until a time point t10, when the actuator driving time interval Tb is elapsed from the time point t9.

Another example of a timing chart is explained on the basis of FIG. 14 in which the vehicle AM varies its speed V on passing the rough part RP of the road surface. When the vehicle AM runs on the flat road surface, the vehicle speed V exceeds 90 Km/h at a time point t20. In response to the vehicle speed V exceeding 90 Km/h, the suspension characteristic alteration actuators A1R, A1L, A2R and A2L are started to be driven, and the suspension characteristic is altered from 'SOFT' state to 'SPORT' state at a time point t21 when the completion time interval Ta is elapsed from the time point t20. Subsequently, at a time point t23, the front wheels W1L and W1R start to pass over the rough part RP of the road surface. Accordingly, the maximum vehicle height change H1 within the time interval T1 between the time point t23 and a time point t24 detected by the front height sensor H1L (or H1R) is made greater than the alteration determination reference value HK1. The vehicle speed V is 110 Km/h at the time point t24. The suspension characteristic alteration actuators A1R, A1L, A2R and A2L start to be driven from the time point t24, and the suspension characteristic is altered from 'SPORT' to 'HARD' state at a time point t25 when the time interval Ta is elapsed from the time point t24. All of the maximum vehicle height changes H2, H3, and H4, for the returning determination time interval T2 respectively from the time point t24 to the time point t27, from t27 to t28, and from t28 to t29, are greater than the returning determination reference vehicle height HK2. Therefore, the vibration exerted to the vehicle body is not judged to be sufficiently damped, and the suspension characteristic is not returned. However, the vehicle speed V is reduced to 60 Km/h at a time point t29 when the suspension characteristic alteration actuators A1R, A1L, A2R, and A2L are started to be driven, and the suspension characteristic is returned from 'HARD' state to 'SPORT' state at a time point t30.

All of the maximum vehicle height changes H5, H6 and H7 for the returning determination time interval T2 respectively from the time point t29 to the time point t32, from t32 to t33 and from t33 to t34 are made smaller than the returning determination reference vehicle height Hk2. Therefore, the vibration exerted to the vehicle body is judged to be sufficiently damped and the vehicle speed V is decreased to 50 Km/h at a time point t34. Accordingly, the suspension characteristic alteration actuators A1R, A1L, A2R and A2L start to be driven at the time point t34, and the suspension characteristic is returned from 'SPORT' state to 'SOFT' state at a time point t35, which is the time point when the time interval Ta is elapsed from the time point t34.

In the manner as explained above, the suspension characteristic is successively controlled in accordance with the vehicle speed and the road conditions.

In the present embodiment, the right and left height sensors, the ECU 4 and the process steps (steps 114, 214, 314, and 414) executed by the ECU 4 integrally function as the vehicle height detection means M1. The ECU 4 and the process steps (steps 100, 102, 104, 106, 108, 110, 112, 114, 116 118, 120, 122, 124, 126, and 128) executed by the ECU 4 integrally function as the determination means M2. The right and the left front air suspensions S1R and S1L, the right and the left rear suspensions S2R and S2L, the ECU 4 and the process steps (steps 142, 144, 146, 148, 150, 152, 154, 156, 158 and 160) executed by the ECU 4 integrally function as the suspension characteristic alteration means M3.

The suspension controller explained hereinabove in detail according to the present embodiment has a structure in which, the front height sensor H1L (or H1R) detects the vehicle height in the detection time interval ts, and if the maximum vehicle height change H1 within the alteration determination time interval T1 which is preset to 0.6 sec. i.e., about half of the resonant cycle time of sprung 0.8 sec., becomes not less than the alteration determination reference value HK1, the suspension characteristic is altered to 'SPORT' or 'HARD' state in accordance with the vehicle speed V. Owing to the structure as mentioned above, one advantage of the present embodiment is to surely detect vibrations having a cycle time close to the resonant cycle time of sprung mass ranging in frequency from 1.2–1.3 Hz within the smallest time interval.

The above-mentioned advantage brings about the additional advantage that the suspension controller according to the present embodiment is able to rapidly calm down the vibration exerted on the vehicle by altering the suspension characteristic to 'SPORT' or 'HARD' state, since the detection of 'pitching' and 'bouncing' are promptly performed in the present invention.

Another advantage of the embodiment is that it can adequately cope with both a long rough road and a short section rough road. This is because the embodiment is so constructed as to determined the returning time of the altered suspension characteristic only after three consecutive detections of maximum vehicle height change less than the reference value HK2. So, for a long rough road, the suspension characteristic is held altered, while for a short rough road, it is promptly returned to the original state.

In the embodiment, when the suspension characteristic is in the relatively soft state, i.e., 'SOFT' against 'SPORT' or 'SPORT' against 'HARD', the determination time interval T1 is set to be short, 0.5 sec., and the reference value HK1 is set to be relatively large, 11, for altering the suspension characteristic to the harder state. While, for returning the suspension characteristic to the softer state, the determination time interval T2 is set to be relatively long, 0.55 sec., and the reference value HK2 is set to be relatively small, 8. That is, for altering the suspension characteristic, a large amplitude, short cycle time vibration is mainly detected and, for returning a small amplitude, long cycle time vibration is mainly detected. Owing to this setting, a hunting between the softer and the harder suspension states is prevented, resulting in improved reliability and prolonged life of the actuators A1R, A1L, A2R and A2L.

The alteration determination time interval T1 is set to be 0.5 sec. and the returning determination time interval T2 is set to be 0.66 sec. in the embodiment, both a little longer than the half cycle time of the resonant vibration of sprung mass. Since the half cycle time of the resonant vibration of unsprung mass is shorter than that, the present embodiment can also detect the resonant vibration of unsprung mass. That enables prompt detection of the first shock by the rough road, preventing so-called bottoming or bounded stopper bumping with the suspension alteration operation.

The suspension controller according to the present embodiment performs the suspension control on the basis of the table which defines the optimum suspension characteristic in accordance with the vehicle speed, and so the suspension controller including the map as above is effective for improving drivability and stability of the vehicle, especially when the vibration of the vehicle running at a high speed is to be damped rapidly.

These and other advantages as mentioned above enable the suspension controller to alter the suspension characteristic to a harder state by detecting and determining the vibration having a cycle time within a predetermined cycle range in response to the vehicle running on the continuous rough road or the vehicle with a vibration having a cycle time within a predetermined range. Accordingly, the suspension controller as described above is able to maintain drivability and stability of the vehicle at a high level, while rapidly damping the vibrations for improving riding comfort.

The suspension controller according to the present embodiment performs to return the suspension characteristic that has been once altered to a harder state back to the original state, if the maximum vehicle height change is not more than the returning determination reference value HK2 within the returning determination time interval. The suspension controller may be alternatively operated to perform the control for returning the suspension characteristic to the original state after a predetermined lag time has elapsed since the suspension characteristic is altered to a harder state, while starting to recount the above-mentioned lag time in response to a vehicle height change detected that again exceeds the alteration determination reference value HK1.

Examples of rear suspension characteristic alteration means other than air suspensions or shock absorbers are described below.

Figure 15A:
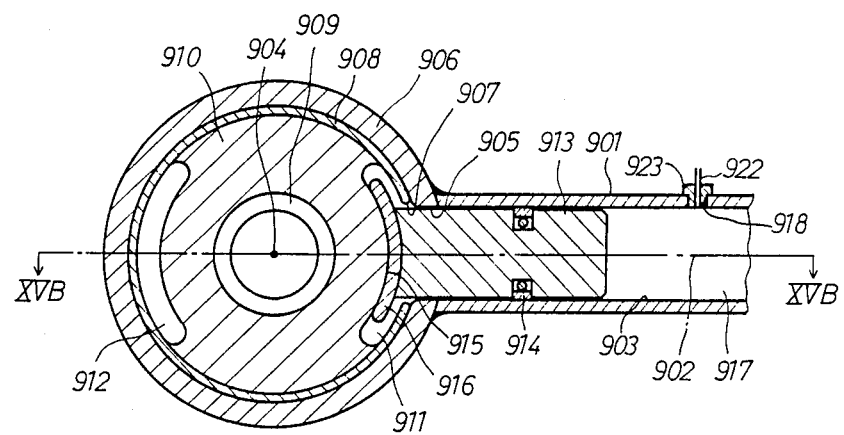
FIG. 15A is a longitudinal cross-section of a rubber bush as a first example of such an unit.
Figure 15B:
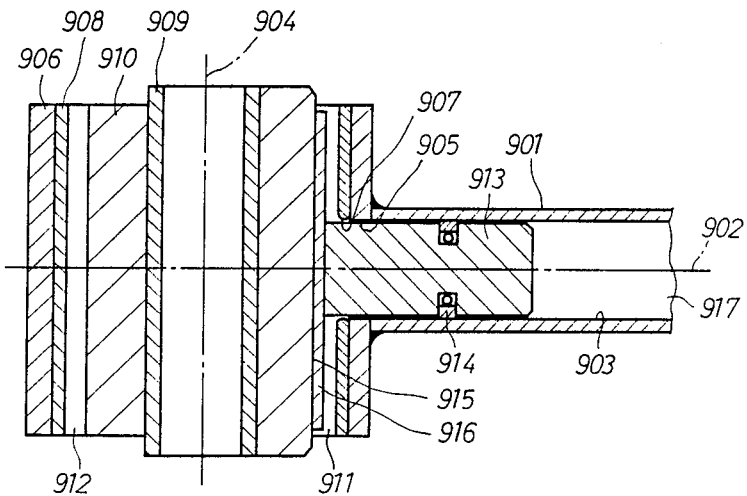
FIG. 15B is a cross-sectional view of the first example taken along line XVB—XVB.

The first example is a bush for joining suspension bars such as the upper and lower control arms of a suspension, as shown in FIGS. 15A and 15B. The stiffness of the bush can be changed so as to alter the characteristic of the suspension. The spring constant and damping force of the bush are varied accompanied with changes of the bush stiffness.

FIG. 15A shows a sectional view of the joint of the suspension bar. FIG. 15B shows a sectional view taken on line XVB—XVB of FIG. 15A. In the drawings, numeral 901 designates a control arm extending along an axis 902 and having a hole 903. A sleeve 906, which extends along an axis 904 perpendicular to the axis 902 and which has a haole 905, is welded around the hole 905 at one end of the control arm 901. An outer cylinder 908 having a hole 907 is press-fitted in the sleeve 906. An inner cylinder 909 is provided in the outer cylinder 908 concentrically thereto. A bush 910 made of vibration-proof rubber is interposed between the outer cylinder 908 and the inner cylinder 909. The bush 910 and the outer cylinder 908 define arc-shaped openings 911 and 912 which are located to be opposed to each other along the axis 904, thus the stiffness in the direction of the axis 902 is set at a relatively low value. The hole 903 of the control arm 901 constitutes a cylinder which supports a piston 913 for movement back and forth along the axis 902. A sealing member 914 is tightly packed in between the piston 913 and the inside surface of the hole 903. A contact plate 916 is secured at one end of the piston 913. The contact plate 916 curves about and extends along the axis 904, thus being brought into contact with the inside surface 915 of the opening 911.

The other end of the control arm 901 is constructed the same as shown in FIGS. 15a and 15B. A cylinder chamber 917 is defined between the piston 913 and another piston (not shown in the drawings) and is fitted with the other end of the control arm 901. The cylinder chamber 917 is connected with the exterior through a tapped hole 918 provided in the control arm 901. A nipple 923, fixed on one end 922 of a conduit connected to an oil pressure source (not shown in the drawings), is secured in the tapped hole 918 to apply oil pressure to the cylinder chamber 917.

When the oil pressure in the cylinder chamber 917 is relatively low, the force pushing the piston 913 leftward in the drawings is so weak that the piston is held in such a position (shown in the drawings) that the contact plate 916 is brought into light contact with the inner surface 915 of the bush 910. As a result, the stiffness of the bush 910 in the direction of the axis 902 is made relatively low. When the oil pressure in the cylinder chamber 917 is relatively high, the piston 913 is driven leftward in the drawings and the contact plate 916 pushes the inner surface 915 of the bush 910 so that the portion of the bush between the contact plate and the inner cylinder 909 is compressed. As a result, the stiffness of the bush 910 in the direction of the axis 902 is raised.

If the suspension bar is provided between the body and the rear wheel of a vehicle, the characteristic of the suspension for the rear wheel can be altered by controlling the oil pressure in the cylinder chamber 917 through the action of an actuator such as a pressure control valve. When the oil pressure is raised by an instruction from the ECU 4, the stiffness of the bush 910 is enhanced to increase the damping force and spring constant of the suspension. Thus, the suspension characteristic is altered to 'HARD' state so as to improve the controllability and stability of the vehicle. When the oil pressure is lowered, the damping force for the rear part of the vehicle is reduced.

Figure 16A:
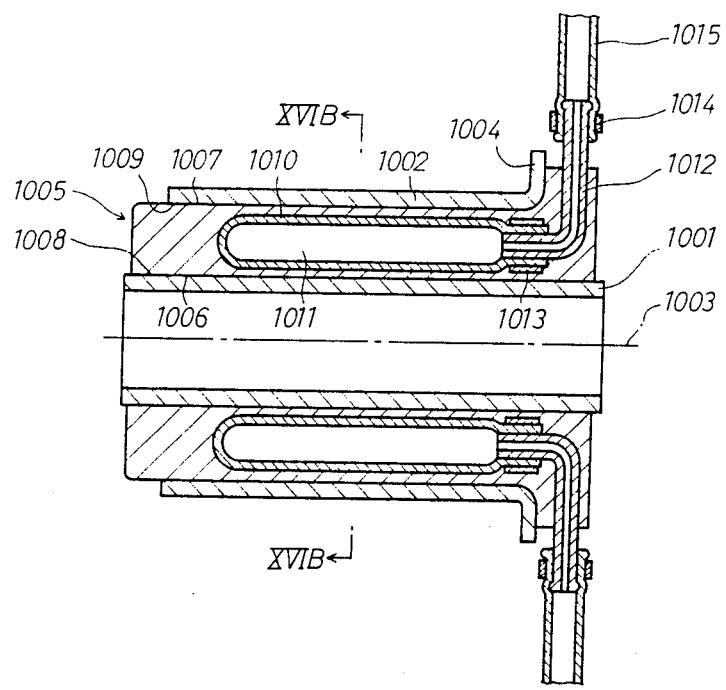
FIG. 16A is a cross-sectional view of another rubber bush as a second example of such an unit.
Figure 16B:
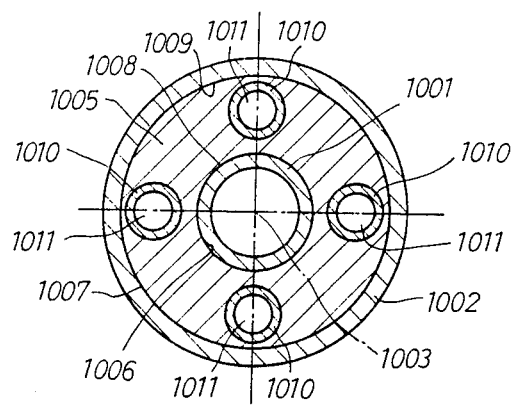
FIG. 16B is a cross-sectional view of the second example taken along line XVIB—XVIB.

The second example is another bush which is shown in FIGS. 16A and 16B and which have the same function as the former.

FIG. 16A shows a sectional view of the bush integrally constructed with inner and outer cylinders as a bush assembly. FIG. 16B shows a sectional view taken on line XVIB—XVIB of FIG. 16A. In the drawings, four expansible and compressible hollow bags 1010, which extend along an axis 1003 and which are separately located in equiangular positions around the axis, are embedded in a bush 1005. The hollow bags 1010 define four chambers 1011 extending along the axis 1003 and being separately located at equiangular positions around the axis. Each hollow bag 1010 is secured at one end on one end of a coupler 1012, embedded in the bush 1005 by a clamp 1013, so as to connect the chambers 1011 with the exterior by means of the coupler 1012. One end of a hose 1015 is fixedly connected to the other end of the coupler 1012 by a clamp 1014, and the other end of the hose 1015 is connected to a compressed air source by means of an actuator such as a presswure control valve (not shown in the drawings). The controlled air pressure can be introduced into each chamber 1011. When the actuator is put in operation by the ECU 4, the air pressure in each chamber 1011 can be varied to change the stiffness of the bush in a stepless manner. The stiffness of the bush can thus be appropriately altered to be high (HARD) or low (SOFT) after a shock at the front wheels is detected.

FIGS. 17A-17G show a construction of a stabilizer as the third example.

Figure 17A:
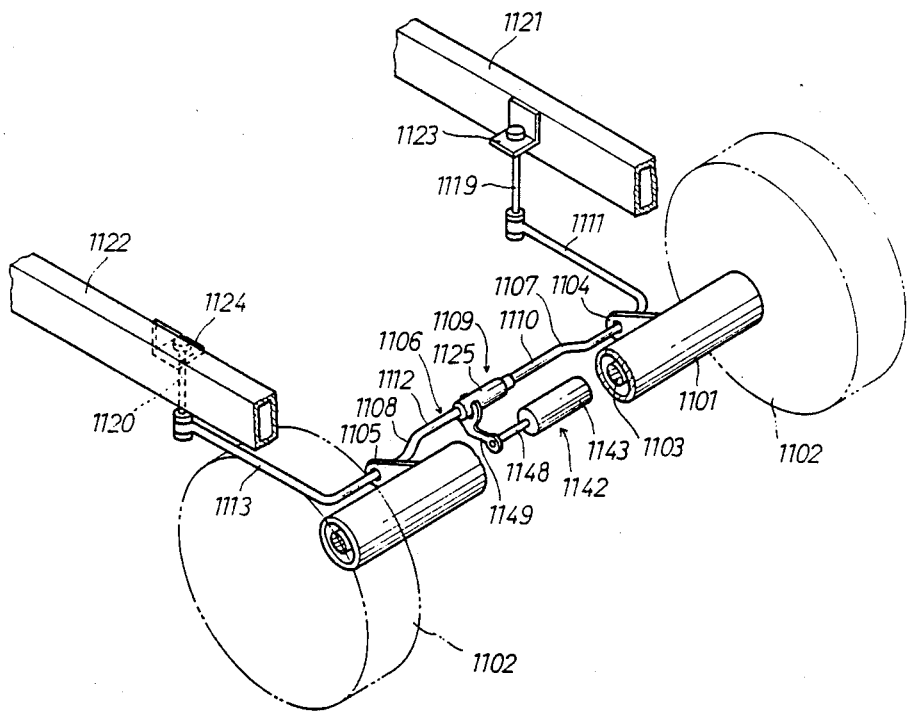
FIG. 17A is a perspective view of a stabilizer as a third example in use.
Figure 17B:
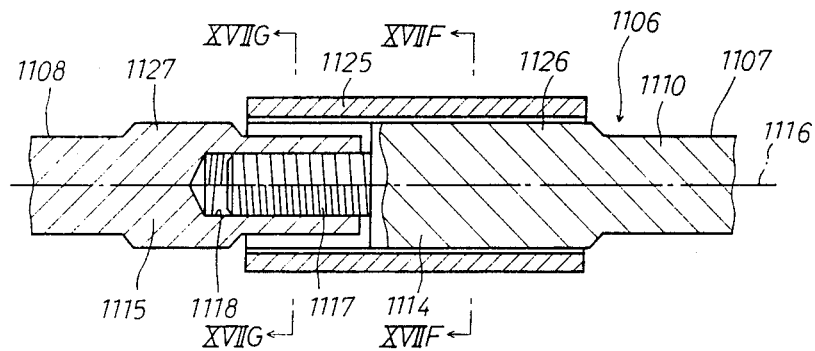
FIGS. 17B–17C are partially enlarged cross-sectional views showing two different parts of the third examples.
Figure 17C:
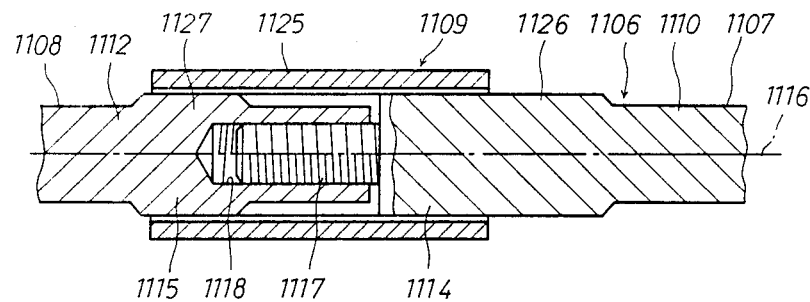
Figure 17D:
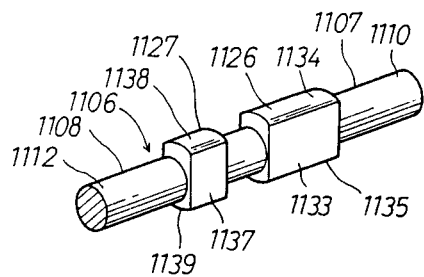
FIG. 17D is a perspective view showing main parts of the third example.
Figure 17E:
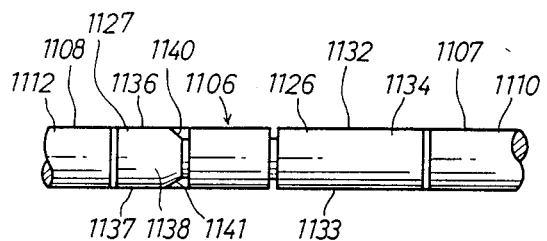
FIG. 17E is a plan view of the third example.
Figure 17F:
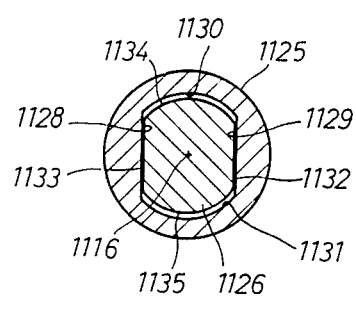
FIG. 17F is a cross-sectional view of FIG. 17B taken along line XVIIF—XVIIF.
Figure 17G:
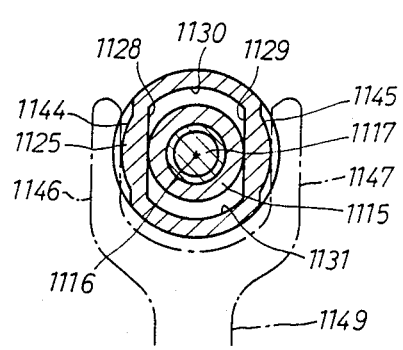
FIG. 17G is a cross-sectional of FIG. 17B taken along line XVIIG—XVIIG.

FIG. 17A shows an exploded perspective view of a torsion-bar-type stabilizer built in an axle-type rear suspension of an automobile. FIGS. 17B and 17C respectively show enlarged partial sectional views of the main part of the stabilizer of FIG. 17A in the coupled and uncoupled states. FIG. 17D shows a perspective view of the main part shown in FIGS. 17B and 17C, omitting the clutch. FIG. 17E shows a plan view of the main part shown in FIG. 17D. FIG. 17E shows a plan view of the main part shown in FIG. 17D. FIG. 17F shows a cross-sectional view taken along line XVIIF—XVIIF of FIG. 17B. FIG. 17G shows a cross-sectional view taken along line XVIIG—XVIIG of FIG. 17B.

In the drawings, an axle 1103 coupled with wheels 1102 is rotatably supported by an axle housing 1101. A pair of brackets 1104 and 1105 is secured on the axle housing 1101 in positions separated from each other in the direction of the width of the body. A torsion-bar-type stabilizer 1106 is coupled to the axle housing 1101 by means of bushes (not shown in the drawings) by the brackets 1104 and 1105.

The stabilizer 1106 includes a right portion 1107 and a left portion 1108 which can be selectively coupled to each other by a coupling unit 1109. A protrusion 1117 and a hole 1118, which extend along an axis 1116, are respectively formed at the ends 1114 and 1115 of rods 1110 and 1112 opposite the arms 1111 and 1113, as shown in FIG. 17B. The protrusion 1117 and the hole 1118 are respectively constructed as a male screw and a female screw which are engaged with each otehr so as to couple the rods 1110 and 1112 rotatably to each other around the axis 1116. The tips of the arms 1111 and 1113 are coupled to brackets 1123 and 1124, secured on side frames 1121 and 1122 of the vehicle by links 1119 and 1120. As shown in FIG. 17C, the coupling unit 1109 includes a cylindrical clutch 1125, a clutch guide 1126 and a clutch bearer 1127. The clutch guide 1126 is provided at one end 1114 of the rod 1110 and supports the clutch 1125 non-rotatably around the axis 1116 but permitting movement back and forth along the axis. The clutch bearer 1127 is provided at the end 1115 of the rod 1112 and bears the clutch 1125 non-rotatably around the axis 1116. The inside circumferential surface of the clutch 1125 includes planes 1128 and 1129 facing each other relative to the axis 1116 and extending in parallel with each other along the axis, and partially cylindrical surfaces 1130 and 1131 adjoining the planes in position opposed to each other relative to the axis 1116, as shown in FIG. 17F. Corresponding to the inside circumferential surface of the clutch 1125, the peripheral surface of the clutch guide 1126 includes planes 1132 and 1133 facing each other relative to the axis 1116 and extending in parallel with each other along the axis, and partially cylindrical surfaces 1134 and 1135 adjoining the planes in positions opposed to each other relative to the axis 1116. The peripheral surface of the clutch bearer 1127 includes planes 1136 and 1137 facing each other relative to the axis 1116 and extending in parallel with each other along the axis, and partially cylindrical surfaces 1138 and 1139 adjoining the planes in positions opposed to each other relative to the axis 1116, as shown in FIG. 17D or FIG. 17E.

The planes 1132 and 1133 of the clutch guide 1126 are always engaged with those 1128 and 1129 of the clutch 1125 as shown in FIG. 17F. When the clutch 1125 is in a position shown in FIG. 17C, planes 1136 and 1137 of the clutch bearer 1127 are also engaged with those 1128 and 1129 so that the right portion 1107 and the left portion 1108 of the stabilizer are integrally coupled to each other so as not to rotate along the axis 1116. As shown in FIG. 17E, the ends 1140 and 1141 of the planes 1136 and 1137 of the clutch bearer 1127 at the right portion 1107 of the stabilizer are chamfered. Even if the rods 1110 and 1112 are slightly rotated to each other around the axis 1116, the clutch 1125 can be moved from a position shown in FIG. 17B to a position shown in FIG. 17C. The right portion 1107 of the stabilizer is thus integrally coupled to the left portion 1108 thereof as the arms 1111 and 1113 of the portions are on the same plane.

The clutch 1125 is moved back and forth along the axis 1116 by an actuator 1142 controlled by the ECU 4. The actuator 1142 shown in FIG. 17A incldues a hydraulic piston-cylinder unit 1143 secured on a differential casing (not shown in the drawing), and a shifting fork 1149. The fork 1149 has arms 1146 and 1147 engaged in grooves 1144 and 1145 of the peripheral surface of the clutch 1125, as shown in FIG. 17G, and is coupled to the piston rod 1148 of the piston-cylinder unit 1143 shown in FIG. 17A.

When the clutch 1125 is placed in a position shown in FIG. 15C by the actuator 1142 according to an instruction from the ECU 4, the right portion 1107 and left portion 1108 of the stabilizer 1106 are integrally coupled to each other to reduce the rolling of the vehicle, thus improving its controllability and stability. On the other hand, when the clutch 1125 is placed in a position shown in FIG. 17B by the actuator 1142, the right portion 1107 and left portion 1108 of the stabilizer 1106 can be rotated relative to each other around the axis 1116 to reduce the shock to the vehicle, and more particularly to reduce the shock to the wheels of only one side of the vehicle, thus improving the riding comfort of the vehicle.

Figure 18A:
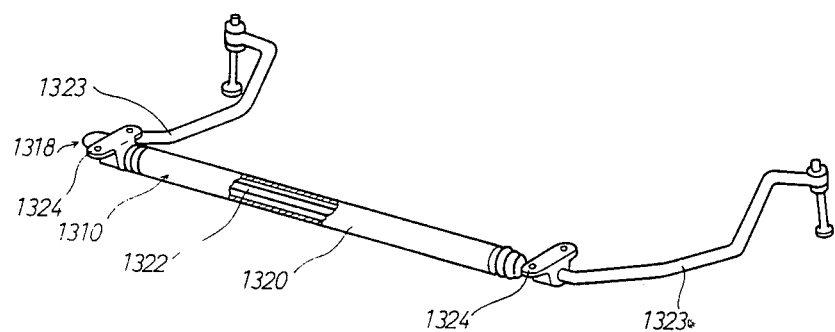
FIG. 18A is a perspective view of another stabilizer as a fourth example.
Figure 18B:
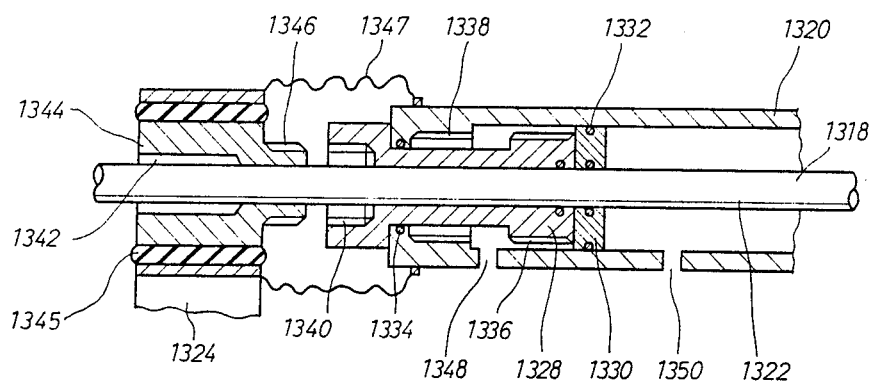
FIG. 18B is a partially enlarged crosssectional view of FIG. 18A.

FIGS. 18A and 18B show another stabilizer as the fourth example.

A stabilizer-bar-type assembly 1310 includes a first stabilizer bar 1318 and a second stabilizer bar 1320, as shown in FIG. 16A. The first stabilizer bar 1318 includes a main portion 1322 and an arm 1323. The main portion 1322 is attached to the body of a vehicle by a pair of fitting metals 1324 so that the main portion 1322 can be twisted around its axis.

The second stabilizer bar 1320 is hollow so that the main portion 1322 of the first stabilizer bar 1318 extends through the second stabilizer bar, as shown in FIG. 16B. The second stabilizer bar 1320 is disposed inside the pair of fitting metals 1324 so that the first stabilizer bar 1318 can be connected to and disconnected from the second stabilizer. A piston 1330, on which a spool 1328 is secured, is slidably fixed inside one end of the second stabilizer bar 1320 in such a manner that the piston is liquid-tightly sealed by a sealing member 1332. The spool 1328 is liquid-tightly sealed by a sealing member 1334, and projects out of the second stabilizer bar 1320. The spool 1328 has splines 1336 near the pistons 1330, while the second stabilzer bar 1320 has, at one end, splines 1338 which can be engaged with the splines 1336. The spool 1328 has other splines 1340 inside the outwardly projecting end thereof.

A coupler 1344 is connected to the main portion 1322 of the first stabilizer bar 1318 by splines 1342. The coupler 1344 has splines 1346 engageable with the splines 1340, which extend from the spool 1328 and which are opposed thereto. The coupler 1344 is connected to a mounting metal 1324 by means of a rubber bush 1345, as shown in FIG. 16B, so that the main portion 1322 of the first stabilizer bar 1318 is twisted by deforming the bush 1345. The coupler 1344 is fitted in such a position that the splines 1340 are engaged with the splines 1346 when the spool 1328 is moved leftward in the drawing, and the splines 1336 are engaged with the splines 1338. A bellowslike boot 1347 for protecting the splines 1340 and 1346 from dust is provided between the coupler 1344 and the second stabilizer bar 1320.

Two ports 1348 and 1350 are provided in the second stabilizer bar 1320 in such a manner that the piston 1330 is located between the ports. Piping is provided to lead a pressure fluid to the ports 1348 and 1350 in use. When the pressure fluid is led to one port 1350 via an actuator such as a pressure control valve, the piston 1330 is moved leftward in the drawing, together with the spool 1328. The splines 1336 are engaged with the splines 1338, and the splines 1340 with the splines 1346. As a result, the first and second stabilizer bars 1318 and 1320 are coupled to each other so as to raise the stiffness of the stabilizer bar assembly. On the contrary, when the pressure fluid is led to the other port 1348, the piston 1330 is moved rightward in the drawing, thus the splines are disengaged from each other. As a result, the stiffness of the stabilizer bar assembly is reduced.

Figure 19A:
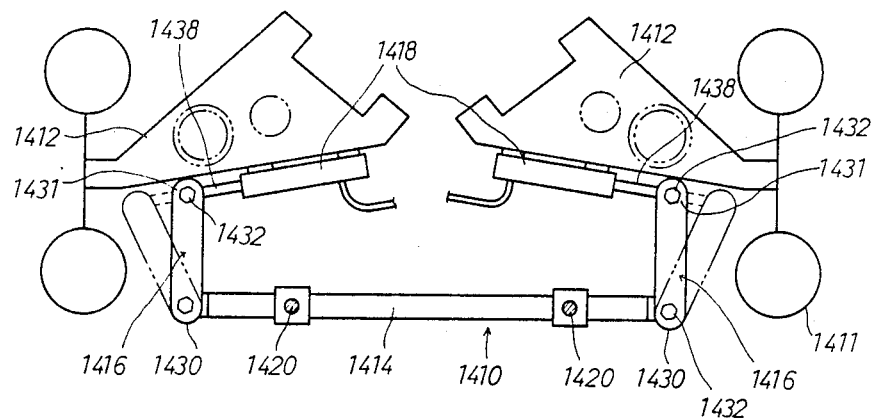
FIG. 19A is a schematic plan view of another stabilizer as a fifth example.
Figure 19B:
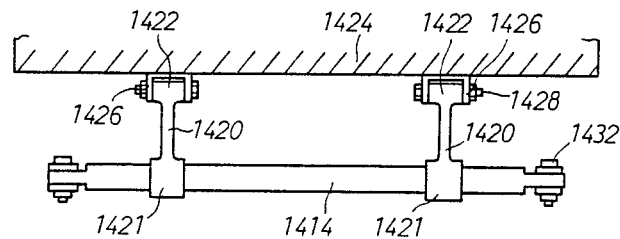
FIG. 19B is an explanatory view showing the structure of one part shown in FIG. 19A.
Figure 19C:
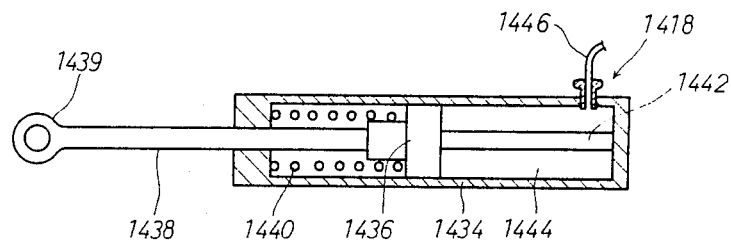
FIG. 19C is a cross-sectional view of an extending part.

FIGS. 19A, 19B and 19C show three different views of still another stabilizer as the fifth example.

FIG. 19A shows a schematic plan view of a stabilizer 1410. In the drawing, numeral 1411 denotes wheels and numeral 1412 denotes suspension arms. The stabilizer 1410 includes a main part 1414, a pair of arms 1416 and extending parts 1418. The main part 1414 in the form of a round bar is laid through bearing portions 1421 of a pair of links 1420 disposed at certain distances apart from each other in the direction of the width of the body 1424 of a vehicle, and is supported by the bearing portions 1421 so that the main part 1414 can be twisted around its axis. The other bearing portions 1422 at the upper ends of the links 1420 are rotatably supported by pins 1428 extending through brackets 1426 welded on the vehicle body 1424. As a result, the main part 1414 is disposed along the width of the vehicle body, and can be twisted relative to the vehicle body.

The pair of arms 1416 are made of flat bars. The first ends 1430 of the arms 1416 are coupled to the ends of the main part 1414 by bolts and nuts 1432 so that the arms can be rotated around vertical axes. The second ends 1431 of the arms 1416 are located at certain distances away from the first ends 1430 to the front-to-rear direction of the vehicle body 1424. The front-to-rear direction is an oblique longitudinal direction.

The second ends 1431 of the arms 1416 are displaced in the direction of the width of the vehicle body 1424 by the extending parts 1418 which may be power cylinders. Each of the power cylidners shown in FIG. 19C includes a cylinder 1434, a piston 1436 liquid-tightly and slidably fitted in the cylinder 1434, a piston rod 1438, which is coupled at one end to the piston 1436 and which projects at the other end out of the cylinder 1434, and a compressed spring 1440 for displacing the piston 1436 in such a direction as to contract the piston rod 1438. A stopper 1442 secured on the piston 1436 prevents the piston from being displaced more than a predetermined distance.

The cylinder 1434 is secured on the suspension arm 1412 in such a manner that the piston rod 1438 is located outside the cylinder 1434 in the direction of the width of the vehicle body. The second end 1431 of the arm 1416 is coupled to the outwardly projecting end 1439 of the piston rod 1438 by the bolts and nuts 1432 so that the arm 1416 can be rotated around the vertical axis.

One end of a flexible hose 1446 is connected to a liquid chamber 1444 of the cylinder 1434 opposite the side on which the compressed spring 1440 is located. The other end of the flexible hose 1446 is connected to a pressure source (not shown in the drawings) through an actuator such as a pressure control valve. Unless pressure is applied to the liquid chambers 1444 of the power cylinders according to the state of the actuator instructed by the ECU 4, the second ends 1431 of the arms 1416 are located in relatively inner positions as shown in FIG. 19A, so that the anti-roll rate of the stabilizer is low.

On the contrary, when the actuator is operated by the ECU 4 to apply pressure to the liquid chambers 1444 of the power cylinders, the pressure acts to the pistons 1436 to push out the piston rods 1438 against the compressed springs 1440. As a result, the second ends 1431 of the arms 1416 are pushed out as indicated by imaginary lines, i.e., double dotted chain lines, in FIG. 19A, to increase the arm ratio of the stabilizer to raise its stiffness against the rolling of the vehicle.

Figure 20A:
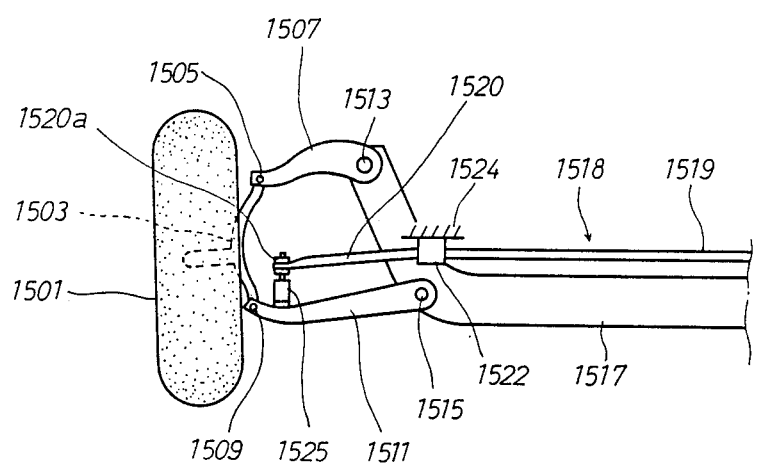
FIG. 20A is a plan view of one part of a stabilizer and a joint as a sixth example in use.
Figure 20B:
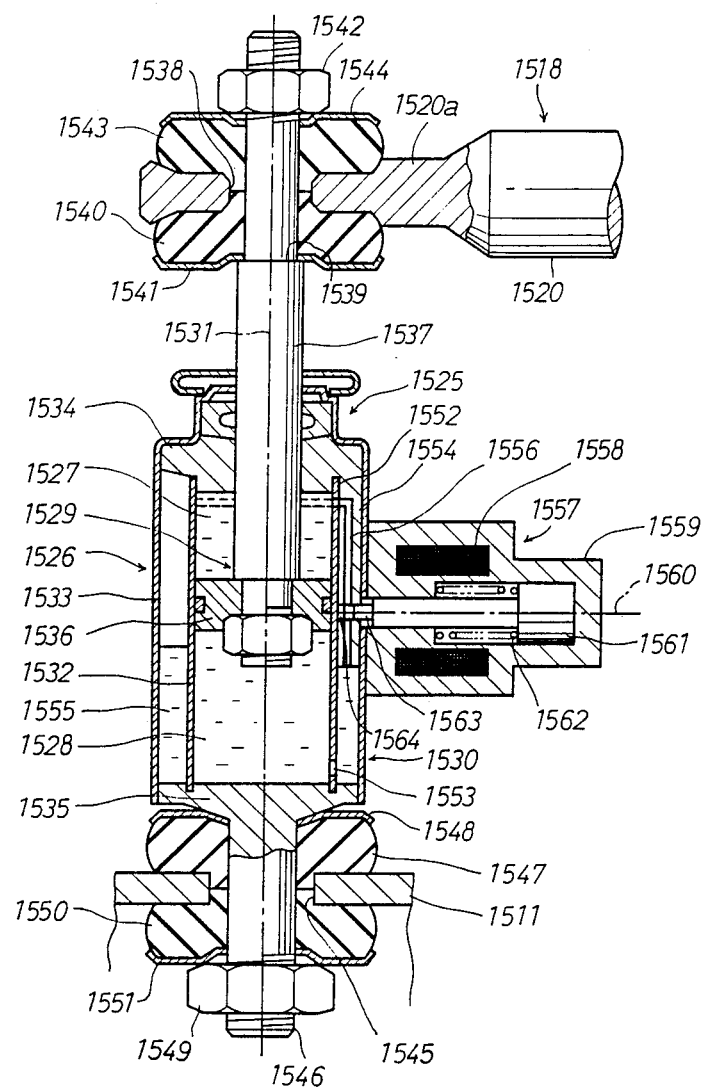
FIG. 20B is a partially enlarged sectional view of the coupling unit shown in FIG. 20A.

FIGS. 20A and 20B show a construction of a coupling unit for a stabilizer and a lower control arm, as the sixth example.

FIG. 20A shows a partial front view of a wishbone-type suspension including a coupling unit for a stabilizer of a vehicle. FIG. 20B shows an enlarged sectional view of the coupling unit shown in FIG. 20A. In the drawings, a wheel 1501 is rotatably supported by a knuckle 1503. The knuckle 1503 is pivotally coupled at the upper end to one end of an upper control arm 1507 by means of a pivot 1505, and is pivotally coupled at the lower end to one end of a lower control arm 1511 by means of a pivot 1509. The upper control arm 1507 and the lower control arm 1511 are pivotally coupled to a cross member 1517 of the vehicle by pivots 1513 and 1515. A stabilizer 1518, which is shaped as a U, is disposed along the width of the vehicle as shown in FIG. 20A. The stabilizer 1518 is coupled at its central rod 1519 to the body 1524 of the vehicle by brackets 1522 by means of rubber bushes (not shown in the drawing), so that the stabilizer can be rotated around its axis. The tip 1520a of an arm 1520 of the stabilizer 1518 is coupled to one portion near one end of the lower control arm 1511 by a coupling unit 1525. FIG. 20B shows the coupling unit 1525 including a piston-cylinder assembly 1526. The piston-cylinder assembly 1526 includes a piston 1529 and a cylinder 1530 which cooperate with each other to define two cylinder chambers 1527 and 1528. The cylinder 1530 includes an inner cylinder 1532 which supports the piston 1529 for movement back and forth along an axis 1531, an outer cylinder 1533 disposed concentrically to the inner cylinder 1532, and end caps 1534 and 1535 which close both the ends of the inner cylinder and the outer cylinder. The piston 1529 includes a main portion 1536 and a piston rod 1537, which bears the main portion 1536 at one end thereof and which extends along the axis 1531 through the end cap 1534 and the hole 1538 of the tip 1520a of the arm 1520 of the stabilizer 1518.

A rubber bush 1540 and a retainer 1541 for holding the bush are interposed between a shoulder 1539 of the piston rod 1537 and the top 1520a. A rubber bush 1543 and a retainer 1544 are interposed between the top 1520a and a nut 1542 screwed on the front end of the piston rod 1537. As a result, the piston rod 1537 is coupled to the tip 1520a of the arm 1520 of the stabilizer 1518 so that an impulsive force is damped. A rod 1546, which extnds along the axis 1531 through a hole 1545 of the lower control arm 1511, is secured on the end cap 1535. A rubber bush 1547 and a retainer 1548 for holding the bush are interposed between the end cap 1535 and the lower control arm 1511. A rubber bush 1550 and a retainer 1551 for holding the bush are interposed between the lower control arm 1511 and a nut 1549 screwed on the front end of the rod 1546. As a result, the rod 1546 is coupled to the lower control arm 1511 so that an impulsive force is damped.

The inner cylinder 1532 is disposed with through holes 1552 and 1553 near the end caps 1534 and 1535. The end cap 1534 is integrally provided with a projection 1554 which extends along the axis 1531 between the inner cylinder 1532 and the outer cylinder 1533 and is located in tight contact with the inner and outer cylinders. The projection 1554 has an internal passage 1556 which is coincident at one end with the through hole 1552 and is open at the other end into an annular space 1555 between the inner cylinder 1532 and the outer cylinder 1533. As a result, the through hole 1552, the internal passage 1556, the annular space 1555 and the other through hole 1553 define a passage means for connecting both the cylinder chambers 1527 and 1528 to each other. A part of the annular space 1555 is filled with air. The cylinder chambers 1527 and 1528, the internal passage 1556 and the remaining part of the annular space 1555 are filled with oil. The change in the volume of the piston rod 1537 in the cylinder 1530, which is caused by the displacement of the piston 1529 from the cylinder 1530, is compensated by compression or expansion of the air filled in the part of the annular space 1555.

The connection of the internal passage 1556 is selectively controlled by a normally-opened solenoid valve 1557. The solenoid valve 1557 includes a core 1561, a compressed helical spring 1562 and a housing 1559 with a solenoid 1558. The housing 1559 is secured at one end on the outer cylinder 1533. The core 1561 is supported in the housing 1559 for movement back and forth along an axis 1560. The compressed helical spring 1562 presses the core 1561 rightward in FIG. 20B. A valve element 1563 is integrally formed as one piece at one end of the core 1561 to be selectively fitted into a hole 1564 extending to penetrate the internal passage 1556 of the projection 1554 in the horizontal direction.

When no electricity is applied to the solenoid 1558 according to an instruction from the ECU 4, the core 1561 is pressed rightward in the drawing by the compressed helical spring 1562 so as to open the valve 1557 to connect the internal passage 1556. On the contrary, when electricity is applied to the solenoid 1558 according to an instruction from the ECU 4, the core 1561 is driven leftward in the drawing against the force of the compressed helical spring 1562 so as to fit the valve element 1563 into the hole 1564 to isolate the internal passage 1556.

In the coupling unit constructed as above, when electricity is applied to the solenoid 1558 of the solenoid valve 1557, the solenoid valve 1557 is closed so as to disconnect the cylinder chambers 1527 and 1528 from each other. Thus, oil in one cylinder chamber is kept from flowing to the other cylinder chamber, so that the piston 1529 is hindered from moving relative to the cylinder 1530 along the axis 1531. As a result, the stabilizer 1518 works for suppressing the rolling of the vehicle so as to keep good control and high stability of the vehicle even when one of the wheels rides over a bump or through a dip in a road surface.

On the other hand, when no electricity is applied to the solenoid 1558, the solenoid valve 1557 is maintained in an open position shown in FIG. 20B, so that oil in both the cylinder chambers 1527 and 1528 can freely flow to each other via the internal passage 1556 and so forth. As a result, the piston 1529 can be smoothly moved in the cylinder 1530 so that the tips of both the right and left arms 1520 can be smoothly moved around the corresponding lower control arms 1511. Since the stabilizer does not work this time, the damping force for rear wheels of the vehicle is reduced to keep good riding comfort.

Although the invention has been described with reference to specific embodiments thereof, it will be apparent that numerous changes and modifications may be made therein without departing from the scope of the invention. It is, therefore, to be understood that it is not intended to limit the invention to the embodiment shown but only by the scope of the claims which follow.

While there have been described a preferred from the invention, obviously modifications and variations are possible in light of the above teachings. It is therefore to be understood that within the true scope of the appended claims, invention may be practiced otherwise than as specifically described.

What is claimed is:

1. A suspension controller for a vehicle having a suspension between a body and a wheel, comprising:
   vehicle height detection means for detecting a vehicle height at a front wheel and for generating a vehicle height signal according to said detected distance;
   determination means having means for receiving said vehicle height signal, means for generating height data responsive to said vehicle height signal, means for determining whether the difference between a maximum and a minimum value of said height data during a predetermined period is greater than a reference value, said period being smaller than a cycle time of sprung mass vibration of said vehicle, and means for generating a suspension control signal in response to said height data; and
   a suspension characteristic alteration means for altering at least one characteristic of the suspension in response to said suspension control signal.

2. A suspension controller as claimed in claim 1, wherein said period has a value between a greater cycle and a full cycle of said sprung mass vibration.

3. A suspension controller as claimed in claim 1 or claim 2, wherein said height data is a function of a displacement of said distance from an average value thereof.

4. A suspension controller as claimed in claim 1 or claim 2, wherein said height data is a function of a speed of change of said distance.

5. A suspension controller as claimed in claim 1 or claim 2, wherein said height data is a function of an acceleration of change of the distance.

6. A suspension controller as claimed in claim 1 or claim 2, wherein the determination means generates an amplitude of a vibration of the distance as the height data.

7. The suspension controller as claimed in claim 3 including means for detecting a speed of said vehicle, wherein said means for generating a suspension control signal includes means for generating said suspension control signal as a function of said detected vehicle speed.

8. The suspension controller as claimed in claim 7 including means for detecting a state of one of acceleration and deceleration of said vehicle, wherein said means for generating said suspension control signal includes means for generating said suspension control signal as a function of said detected acceleration and deceleration conditions.

9. The suspension controller as claimed in claim 8 including means for setting said predetermined period as one of an alteration determination period T1 and a subsequent returning determination period T2, wherein:

$$T1 < T2$$

and said reference value is greater during determination period T1 than during determination period T2.

10. The suspension controller as claimed in claim 9 wherein said means for generating a suspension control signal includes means for generating said suspension control signal during a determination period T2 only upon said height data being greater than said reference value for three consecutive ones of said determination period T2.

* * * * *